(12) United States Patent
Thurgood

(10) Patent No.: US 11,883,834 B2
(45) Date of Patent: *Jan. 30, 2024

(54) HANDHELD SHOWERHEAD WITH LINEAR NOZZLE ARRAYS

(71) Applicant: WATER PIK, INC., Fort Collins, CO (US)

(72) Inventor: Jeffrey Thurgood, Fort Collins, CO (US)

(73) Assignee: WATER PIK, INC., Fort Collins, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/846,112

(22) Filed: Jun. 22, 2022

(65) Prior Publication Data

US 2022/0314243 A1   Oct. 6, 2022

Related U.S. Application Data

(63) Continuation of application No. 16/565,103, filed on Sep. 9, 2019, now Pat. No. 11,413,632, which is a
(Continued)

(51) Int. Cl.
*B05B 1/16* (2006.01)
*B05B 1/20* (2006.01)
(Continued)

(52) U.S. Cl.
CPC .......... *B05B 1/1636* (2013.01); *A01K 13/001* (2013.01); *A61D 11/00* (2013.01);
(Continued)

(58) Field of Classification Search
CPC .......... B05B 1/1636; B05B 1/18; B05B 1/20; B05B 1/3026; B05B 1/205; A01K 13/001; A61D 11/00
(Continued)

(56) References Cited

U.S. PATENT DOCUMENTS

| | | |
|---|---|---|
| 203,094 A | 4/1878 | Wakeman |
| 204,333 A | 5/1878 | Josias |

(Continued)

FOREIGN PATENT DOCUMENTS

| | | |
|---|---|---|
| CA | 659510 | 3/1963 |
| CA | 2341041 | 8/1999 |

(Continued)

OTHER PUBLICATIONS

Author Unknown, "Flipside: The Bold Look of Kohler," 1 page, at least as early as Jun. 2011.
(Continued)

*Primary Examiner* — Steven J Ganey
(74) *Attorney, Agent, or Firm* — Dorsey & Whitney LLP

(57) ABSTRACT

A handheld spray wand for showering, bathing, or the like. The spray wand including a fluid inlet and a nozzle portion in fluid communication with the fluid inlet. The nozzle portion including a first nozzle array extending along a longitudinal direction of the nozzle portion and a second nozzle array positioned adjacent to the first nozzle array and extending along the longitudinal direction of the nozzle portion. Within the nozzle arrays, the nozzles may be staggered to define a staggered water pattern as water exits the nozzle portion.

22 Claims, 12 Drawing Sheets

Related U.S. Application Data continuation of application No. 15/422,450, filed on Feb. 1, 2017, now Pat. No. 10,449,558.

(60) Provisional application No. 62/289,833, filed on Feb. 1, 2016, provisional application No. 62/289,855, filed on Feb. 1, 2016.

(51) Int. Cl.

| | | |
|---|---|---|
| *A61D 11/00* | (2006.01) | |
| *A01K 13/00* | (2006.01) | |
| *B05B 1/18* | (2006.01) | |
| *B05B 1/30* | (2006.01) | |

(52) U.S. Cl.
CPC ............. *B05B 1/18* (2013.01); *B05B 1/20* (2013.01); *B05B 1/205* (2013.01); *B05B 1/3026* (2013.01)

(58) Field of Classification Search
USPC ....... 239/525, 530, 532, 443, 444, 446, 447, 239/556, 581.1, 566–568, 754; 119/603, 119/604, 665
See application file for complete search history.

(56) References Cited

U.S. PATENT DOCUMENTS

| | | |
|---|---|---|
| 309,349 A | 12/1884 | Hart |
| 428,023 A | 5/1890 | Schoff |
| 432,712 A | 7/1890 | Taylor |
| 445,250 A | 1/1891 | Lawless |
| 453,109 A | 5/1891 | Dreisorner |
| 486,986 A | 11/1892 | Schinke |
| 566,384 A | 8/1896 | Engelhart |
| 566,410 A | 8/1896 | Schinke |
| 570,405 A | 10/1896 | Jerguson et al. |
| 694,888 A | 3/1902 | Pfluger |
| 800,802 A | 10/1905 | Franquist |
| 832,523 A | 10/1906 | Andersson |
| 835,678 A | 11/1906 | Hammond |
| 845,540 A | 2/1907 | Ferguson |
| 854,094 A | 5/1907 | Klein |
| 926,929 A | 7/1909 | Dusseau |
| 1,001,842 A | 8/1911 | Greenfield |
| 1,003,037 A | 9/1911 | Crowe |
| 1,018,143 A | 2/1912 | Vissering |
| 1,046,573 A | 12/1912 | Ellis |
| 1,130,520 A | 3/1915 | Kenney |
| 1,203,466 A | 10/1916 | Benson |
| 1,217,254 A | 2/1917 | Winslow |
| 1,218,895 A | 3/1917 | Porter |
| 1,255,577 A | 2/1918 | Berry |
| 1,260,181 A | 3/1918 | Garnero |
| 1,276,117 A | 8/1918 | Riebe |
| 1,284,099 A | 11/1918 | Harris |
| 1,327,428 A | 1/1920 | Gregory |
| 1,451,800 A | 4/1923 | Agner |
| 1,459,582 A | 6/1923 | Dubee |
| 1,469,528 A | 10/1923 | Owens |
| 1,500,921 A | 7/1924 | Bramson et al. |
| 1,560,789 A | 11/1925 | Johnson et al. |
| 1,597,477 A | 8/1926 | Panhorst |
| 1,633,531 A | 6/1927 | Keller |
| 1,669,949 A | 5/1928 | Reynolds |
| 1,692,394 A | 11/1928 | Sundh |
| 1,695,263 A | 12/1928 | Jacques |
| 1,724,147 A | 8/1929 | Russell |
| 1,724,161 A | 8/1929 | Wuesthoff |
| 1,736,160 A | 11/1929 | Jonsson |
| 1,754,127 A | 4/1930 | Srulowitz |
| 1,758,115 A | 5/1930 | Kelly |
| 1,778,658 A | 10/1930 | Baker |
| 1,821,274 A | 9/1931 | Plummer |
| 1,849,517 A | 3/1932 | Fraser |
| 1,890,156 A | 12/1932 | Konig |
| 1,906,575 A | 5/1933 | Goeriz |
| 1,934,553 A | 11/1933 | Mueller et al. |
| 1,946,207 A | 2/1934 | Haire |
| 2,011,446 A | 8/1935 | Judell |
| 2,024,930 A | 12/1935 | Judell |
| 2,033,467 A | 3/1936 | Groenlger |
| 2,044,445 A | 6/1936 | Price et al. |
| 2,085,854 A | 7/1937 | Hathaway et al. |
| 2,096,912 A | 10/1937 | Morris |
| 2,117,152 A | 5/1938 | Crosti |
| D113,439 S | 2/1939 | Reinecke |
| 2,196,783 A | 4/1940 | Shook |
| 2,197,667 A | 4/1940 | Shook |
| 2,216,149 A | 10/1940 | Weiss |
| D126,433 S | 4/1941 | Enthof |
| 2,251,192 A | 7/1941 | Krumslek et al. |
| 2,268,263 A | 12/1941 | Newell et al. |
| 2,285,831 A | 6/1942 | Pennypacker |
| 2,342,757 A | 2/1944 | Roser |
| 2,402,741 A | 6/1946 | Draviner |
| D147,258 S | 8/1947 | Becker |
| D152,584 S | 2/1949 | Becker |
| 2,467,954 A | 4/1949 | Becker |
| 2,518,709 A | 8/1950 | Mosby, Jr. |
| 2,546,348 A | 3/1951 | Schuman |
| 2,567,642 A | 9/1951 | Penshaw |
| 2,581,129 A | 1/1952 | Muldoon |
| D166,073 S | 3/1952 | Dunkelberger |
| 2,648,762 A | 8/1953 | Dunkelberger |
| 2,664,271 A | 12/1953 | Arutunoff |
| 2,671,693 A | 3/1954 | Hyser et al. |
| 2,676,806 A | 4/1954 | Bachman |
| 2,679,575 A | 5/1954 | Haberstump |
| 2,680,358 A | 6/1954 | Zublin |
| 2,726,120 A | 12/1955 | Bletcher et al. |
| 2,759,765 A | 8/1956 | Pawley |
| 2,776,168 A | 1/1957 | Schweda |
| 2,792,847 A | 5/1957 | Spencer |
| 2,873,999 A | 2/1959 | Webb |
| 2,930,505 A | 3/1960 | Meyer |
| 2,931,672 A | 4/1960 | Merritt et al. |
| 2,935,265 A | 5/1960 | Richter |
| 2,949,242 A | 8/1960 | Blumberg et al. |
| 2,957,587 A | 10/1960 | Tobin |
| 2,966,311 A | 12/1960 | Davis |
| D190,295 S | 5/1961 | Becker |
| 2,992,437 A | 7/1961 | Nelson et al. |
| 3,007,648 A | 11/1961 | Fraser |
| D192,935 S | 5/1962 | Becker |
| 3,032,357 A | 5/1962 | Shames et al. |
| 3,034,809 A | 5/1962 | Greenberg |
| 3,037,799 A | 6/1962 | Mulao |
| 3,081,339 A | 3/1963 | Green et al. |
| 3,092,333 A | 6/1963 | Galotto |
| 3,098,508 A | 7/1963 | Gerdes |
| 3,103,723 A | 9/1963 | Becker |
| 3,104,815 A | 9/1963 | Schultz |
| 3,104,827 A | 9/1963 | Aghnides |
| 3,111,277 A | 11/1963 | Grimsley |
| 3,112,073 A | 11/1963 | Larson et al. |
| 3,143,857 A | 8/1964 | Eaton |
| 3,196,463 A | 7/1965 | Farneth |
| 3,231,200 A | 1/1966 | Heald |
| 3,236,545 A | 2/1966 | Parkes et al. |
| 3,239,152 A | 3/1966 | Bachli et al. |
| 3,266,059 A | 8/1966 | Stelle |
| 3,272,437 A | 9/1966 | Coson |
| 3,273,359 A | 9/1966 | Fregeolle |
| 3,306,634 A | 2/1967 | Groves et al. |
| 3,323,148 A | 6/1967 | Burnon |
| 3,329,967 A | 7/1967 | Martinez et al. |
| 3,341,132 A | 9/1967 | Parkison |
| 3,342,419 A | 9/1967 | Weese |
| 3,344,994 A | 10/1967 | Fife |
| 3,363,842 A | 1/1968 | Burns |
| 3,383,051 A | 5/1968 | Fiorentino |
| 3,389,925 A | 6/1968 | Gottschald |
| 3,393,311 A | 7/1968 | Dahl |

(56) References Cited

U.S. PATENT DOCUMENTS

| | | |
|---|---|---|
| 3,393,312 A | 7/1968 | Dahl |
| 3,404,410 A | 10/1968 | Sumida |
| 3,492,029 A | 1/1970 | French et al. |
| 3,516,611 A | 6/1970 | Piggott |
| 3,546,961 A | 12/1970 | Marton |
| 3,550,863 A | 12/1970 | McDermott |
| 3,552,436 A | 1/1971 | Stewart |
| 3,565,116 A | 2/1971 | Gabin |
| 3,566,917 A | 3/1971 | White |
| 3,580,513 A | 5/1971 | Martin |
| 3,584,822 A | 6/1971 | Oram |
| 3,596,835 A | 8/1971 | Smith et al. |
| 3,612,577 A | 10/1971 | Pope |
| 3,637,143 A | 1/1972 | Shames et al. |
| 3,641,333 A | 2/1972 | Gendron |
| 3,647,144 A | 3/1972 | Parkison et al. |
| 3,663,044 A | 5/1972 | Contreras et al. |
| 3,669,470 A | 6/1972 | Deurloo |
| 3,672,648 A | 6/1972 | Price |
| 3,682,392 A | 8/1972 | Kint |
| 3,685,745 A | 8/1972 | Peschcke-koedt |
| D224,834 S | 9/1972 | Laudell |
| 3,711,029 A | 1/1973 | Bartlett |
| 3,722,798 A | 3/1973 | Bletcher et al. |
| 3,722,799 A | 3/1973 | Rauh |
| 3,731,084 A | 5/1973 | Trevorrow |
| 3,754,779 A | 8/1973 | Peress |
| D228,622 S | 10/1973 | Juhlin |
| D228,908 S | 10/1973 | Juhlin |
| 3,762,648 A | 10/1973 | Deines et al. |
| 3,768,735 A | 10/1973 | Ward |
| 3,786,995 A | 1/1974 | Manooglan et al. |
| 3,801,019 A | 4/1974 | Trenary et al. |
| 3,810,580 A | 5/1974 | Rauh |
| 3,826,454 A | 7/1974 | Zieger |
| 3,840,734 A | 10/1974 | Oram |
| 3,845,291 A | 10/1974 | Portyrata |
| 3,860,271 A | 1/1975 | Rodgers |
| 3,861,719 A | 1/1975 | Hand |
| 3,865,310 A | 2/1975 | Elkins et al. |
| 3,869,151 A | 3/1975 | Fletcher et al. |
| 3,887,136 A | 6/1975 | Anderson |
| 3,896,845 A | 7/1975 | Parker |
| 3,902,671 A | 9/1975 | Symmons |
| 3,910,277 A | 10/1975 | Zimmer |
| D237,708 S | 11/1975 | Grohe |
| 3,929,164 A | 12/1975 | Richter |
| 3,929,287 A | 12/1975 | Givler et al. |
| 3,958,756 A | 5/1976 | Trenary et al. |
| D240,322 S | 6/1976 | Staub |
| 3,963,179 A | 6/1976 | Tomaro |
| 3,967,783 A | 7/1976 | Halsted et al. |
| 3,979,096 A | 9/1976 | Zieger |
| 3,994,443 A | 11/1976 | Shenker |
| 3,997,116 A | 12/1976 | Moen |
| 3,998,390 A | 12/1976 | Peterson et al. |
| 3,999,714 A | 12/1976 | Lang |
| 4,005,880 A | 2/1977 | Anderson et al. |
| 4,006,920 A | 2/1977 | Sadler et al. |
| 4,023,782 A | 5/1977 | Eifer |
| 4,042,984 A | 8/1977 | Butler |
| 4,045,054 A | 8/1977 | Arnold |
| D245,858 S | 9/1977 | Grube |
| D245,860 S | 9/1977 | Grube |
| 4,068,801 A | 1/1978 | Leutheuser |
| 4,081,135 A | 3/1978 | Tomaro |
| 4,084,271 A | 4/1978 | Ginsberg |
| 4,091,998 A | 5/1978 | Peterson |
| D249,356 S | 9/1978 | Nagy |
| 4,117,979 A | 10/1978 | Lagarelli et al. |
| 4,129,257 A | 12/1978 | Eggert |
| 4,130,120 A | 12/1978 | Kohler, Jr. |
| 4,131,233 A | 12/1978 | Koenig |
| 4,133,486 A | 1/1979 | Fanella |
| 4,135,549 A | 1/1979 | Baker |
| D251,045 S | 2/1979 | Grube |
| 4,141,502 A | 2/1979 | Grohe |
| 4,151,955 A | 5/1979 | Stouffer |
| 4,151,957 A | 5/1979 | Gecewicz et al. |
| 4,162,801 A | 7/1979 | Kresky et al. |
| 4,165,837 A | 8/1979 | Rundzaitis |
| 4,167,196 A | 9/1979 | Morris |
| 4,174,822 A | 11/1979 | Larsson |
| 4,185,781 A | 1/1980 | O'Brien |
| 4,190,207 A | 2/1980 | Fienhold et al. |
| 4,191,332 A | 3/1980 | De Langis et al. |
| 4,203,550 A | 5/1980 | On |
| 4,209,132 A | 6/1980 | Kwan |
| D255,626 S | 7/1980 | Grube |
| 4,219,160 A | 8/1980 | Allred, Jr. |
| 4,221,338 A | 9/1980 | Shames et al. |
| 4,239,409 A | 12/1980 | Osrwo |
| 4,243,253 A | 1/1981 | Rogers, Jr. |
| 4,244,526 A | 1/1981 | Arth |
| D258,677 S | 3/1981 | Larsson |
| 4,254,914 A | 3/1981 | Shames et al. |
| 4,258,414 A | 3/1981 | Sokol |
| 4,272,022 A | 6/1981 | Evans |
| 4,274,400 A | 6/1981 | Baus |
| 4,275,843 A | 6/1981 | Moen |
| 4,282,612 A | 8/1981 | King |
| D261,300 S | 10/1981 | Klose |
| D261,417 S | 10/1981 | Klose |
| 4,303,201 A | 12/1981 | Elkins et al. |
| 4,319,608 A | 3/1982 | Raikov et al. |
| 4,324,364 A | 4/1982 | Buzzi et al. |
| 4,330,089 A | 5/1982 | Finkbeiner |
| D266,212 S | 9/1982 | Haug et al. |
| 4,350,298 A | 9/1982 | Tada |
| 4,353,508 A | 10/1982 | Butterfield et al. |
| 4,358,056 A | 11/1982 | Greenhut et al. |
| D267,582 S | 1/1983 | Mackay et al. |
| D268,359 S | 3/1983 | Klose |
| D268,442 S | 3/1983 | Darmon |
| D268,611 S | 4/1983 | Klose |
| 4,383,554 A | 5/1983 | Merriman |
| 4,396,797 A | 8/1983 | Sakuragi et al. |
| 4,398,669 A | 8/1983 | Fienhold |
| 4,425,965 A | 1/1984 | Bayh, III et al. |
| 4,432,392 A | 2/1984 | Paley |
| 4,449,696 A * | 5/1984 | Hengesbach ............ B05B 1/32 |
| | | 239/283 |
| D274,457 S | 6/1984 | Haug |
| 4,461,052 A | 7/1984 | Mostul |
| 4,465,308 A | 8/1984 | Martini |
| 4,467,964 A | 8/1984 | Kaeser |
| 4,495,550 A | 1/1985 | Visciano |
| 4,527,745 A | 7/1985 | Butterfield et al. |
| 4,540,202 A | 9/1985 | Amphoux et al. |
| 4,545,081 A | 10/1985 | Nestor et al. |
| 4,553,775 A | 11/1985 | Halling |
| D281,820 S | 12/1985 | Oba et al. |
| 4,561,593 A | 12/1985 | Cammack et al. |
| 4,564,889 A | 1/1986 | Bolson |
| 4,571,003 A | 2/1986 | Rollng et al. |
| 4,572,232 A | 2/1986 | Gruber |
| D283,645 S | 4/1986 | Tanaka |
| 4,587,991 A | 5/1986 | Chorkey |
| 4,588,130 A | 5/1986 | Trenary et al. |
| 4,598,866 A | 7/1986 | Cammack et al. |
| 4,614,303 A | 9/1986 | Moseley, Jr. et al. |
| 4,616,298 A | 10/1986 | Bolson |
| 4,618,100 A | 10/1986 | White et al. |
| 4,629,124 A | 12/1986 | Gruber |
| 4,629,125 A | 12/1986 | Liu |
| 4,643,463 A | 2/1987 | Halling et al. |
| 4,645,244 A | 2/1987 | Curtis |
| RE32,386 E | 3/1987 | Hunter |
| 4,650,120 A | 3/1987 | Kress |
| 4,650,470 A | 3/1987 | Epstein |
| 4,652,025 A | 3/1987 | Conroy, Sr. |
| 4,654,900 A | 4/1987 | McGhee |
| 4,657,185 A | 4/1987 | Rundzaitis |
| 4,669,666 A | 6/1987 | Finkbeiner |

(56) References Cited

U.S. PATENT DOCUMENTS

| | | |
|---|---|---|
| 4,669,757 A | 6/1987 | Bartholomew |
| 4,674,687 A | 6/1987 | Smith et al. |
| 4,683,917 A | 8/1987 | Bartholomew |
| 4,703,893 A | 11/1987 | Gruber |
| 4,717,180 A | 1/1988 | Roman |
| 4,719,654 A | 1/1988 | Blessing |
| 4,733,337 A | 3/1988 | Bieberstein |
| D295,437 S | 4/1988 | Fabian |
| 4,739,801 A | 4/1988 | Kimura et al. |
| 4,749,126 A | 6/1988 | Kessener et al. |
| D296,582 S | 7/1988 | Haug et al. |
| 4,754,928 A | 7/1988 | Rogers et al. |
| D297,160 S | 8/1988 | Robbins |
| 4,764,047 A | 8/1988 | Johnston et al. |
| 4,778,104 A | 10/1988 | Fisher |
| 4,778,111 A | 10/1988 | Leap |
| 4,787,591 A | 11/1988 | Villacorta |
| 4,790,294 A | 12/1988 | Allred, III et al. |
| 4,801,091 A | 1/1989 | Sandvik |
| 4,809,369 A | 3/1989 | Bowden |
| 4,839,599 A | 6/1989 | Fischer |
| 4,841,590 A | 6/1989 | Terry |
| 4,842,059 A | 6/1989 | Tomek |
| D302,325 S | 7/1989 | Charet et al. |
| 4,850,616 A | 7/1989 | Pava |
| 4,854,499 A | 8/1989 | Neuman |
| 4,856,822 A | 8/1989 | Parker |
| 4,865,362 A | 9/1989 | Holden |
| D303,830 S | 10/1989 | Ramsey et al. |
| 4,871,196 A | 10/1989 | Kingsford |
| 4,896,658 A | 1/1990 | Yonekubo et al. |
| D306,351 S | 2/1990 | Charet et al. |
| 4,901,927 A | 2/1990 | Valdivia |
| 4,903,178 A | 2/1990 | Englot et al. |
| 4,903,897 A | 2/1990 | Hayes |
| 4,903,922 A | 2/1990 | Harris, III |
| 4,907,137 A | 3/1990 | Schladitz et al. |
| 4,907,744 A | 3/1990 | Jousson |
| 4,909,435 A | 3/1990 | Kidouchi et al. |
| 4,914,759 A | 4/1990 | Goff |
| 4,946,202 A | 8/1990 | Perricone |
| 4,951,329 A | 8/1990 | Shaw |
| 4,953,585 A | 9/1990 | Rollini et al. |
| 4,964,573 A | 10/1990 | Lipski |
| 4,972,048 A | 11/1990 | Martin |
| D313,267 S | 12/1990 | Lenci et al. |
| 4,976,460 A | 12/1990 | Newcombe et al. |
| D314,246 S | 1/1991 | Bache |
| D315,191 S | 3/1991 | Mikol |
| 4,998,673 A | 3/1991 | Pilolla |
| 5,004,158 A | 4/1991 | Halem et al. |
| D317,348 S | 6/1991 | Geneve et al. |
| 5,020,570 A | 6/1991 | Cotter |
| 5,022,103 A | 6/1991 | Faist |
| D317,968 S | 7/1991 | Tsai |
| 5,032,015 A | 7/1991 | Christianson |
| 5,033,528 A | 7/1991 | Volcani |
| 5,033,897 A | 7/1991 | Chen |
| D319,294 S | 8/1991 | Kohler, Jr. et al. |
| D320,064 S | 9/1991 | Presman |
| 5,046,764 A | 9/1991 | Kimura et al. |
| D321,062 S | 10/1991 | Bonbright |
| 5,058,804 A | 10/1991 | Yonekubo et al. |
| D322,119 S | 12/1991 | Haug et al. |
| D322,681 S | 12/1991 | Yuen |
| 5,070,552 A | 12/1991 | Gentry et al. |
| D323,545 S | 1/1992 | Ward |
| 5,082,019 A | 1/1992 | Tetrault |
| 5,086,878 A | 2/1992 | Swift |
| 5,090,624 A | 2/1992 | Rogers |
| 5,100,055 A | 3/1992 | Rokitenetz et al. |
| D325,769 S | 4/1992 | Haug et al. |
| D325,770 S | 4/1992 | Haug et al. |
| 5,103,384 A | 4/1992 | Drohan |
| D326,311 S | 5/1992 | Lenci et al. |
| D327,115 S | 6/1992 | Rogers |
| 5,121,511 A | 6/1992 | Sakamoto et al. |
| D327,729 S | 7/1992 | Rogers |
| 5,127,580 A | 7/1992 | Fu-I |
| 5,134,251 A | 7/1992 | Martin |
| D328,944 S | 8/1992 | Robbins |
| 5,141,016 A | 8/1992 | Nowicki |
| D329,504 S | 9/1992 | Yuen |
| 5,143,300 A | 9/1992 | Cutler |
| 5,145,114 A | 9/1992 | Monch |
| 5,148,556 A | 9/1992 | Bottoms et al. |
| D330,068 S | 10/1992 | Haug et al. |
| D330,408 S | 10/1992 | Thacker |
| D330,409 S | 10/1992 | Raffo |
| 5,153,976 A | 10/1992 | Benchaar et al. |
| 5,154,355 A | 10/1992 | Gonzalez |
| 5,154,483 A | 10/1992 | Zeller |
| 5,161,567 A | 11/1992 | Humpert |
| 5,163,752 A | 11/1992 | Copeland et al. |
| 5,171,429 A | 12/1992 | Yasuo |
| 5,172,860 A | 12/1992 | Yuch |
| 5,172,862 A | 12/1992 | Heimann et al. |
| 5,172,866 A | 12/1992 | Ward |
| D332,303 S | 1/1993 | Klose |
| D332,994 S | 2/1993 | Huen |
| D333,339 S | 2/1993 | Klose |
| 5,197,767 A | 3/1993 | Kimura et al. |
| D334,794 S | 4/1993 | Klose |
| D335,171 S | 4/1993 | Lenci et al. |
| 5,201,468 A | 4/1993 | Freier et al. |
| 5,206,963 A | 5/1993 | Wiens |
| 5,207,499 A | 5/1993 | Vajda et al. |
| 5,213,267 A | 5/1993 | Heimann et al. |
| 5,220,697 A | 6/1993 | Birchfield |
| D337,839 S | 7/1993 | Zeller |
| 5,228,625 A | 7/1993 | Grassberger |
| 5,230,106 A | 7/1993 | Henkin et al. |
| D338,542 S | 8/1993 | Yuen |
| 5,232,162 A | 8/1993 | Chih |
| D339,492 S | 9/1993 | Klose |
| D339,627 S | 9/1993 | Klose |
| D339,848 S | 9/1993 | Gottwald |
| 5,246,169 A | 9/1993 | Heimann et al. |
| 5,246,301 A | 9/1993 | Hirasawa |
| D340,376 S | 10/1993 | Klose |
| 5,253,670 A | 10/1993 | Perrott |
| 5,253,807 A | 10/1993 | Newbegin |
| 5,254,809 A | 10/1993 | Martin |
| D341,007 S | 11/1993 | Haug et al. |
| D341,191 S | 11/1993 | Klose |
| D341,220 S | 11/1993 | Eagan |
| 5,263,646 A | 11/1993 | McCauley |
| 5,265,833 A | 11/1993 | Heimann et al. |
| 5,268,826 A | 12/1993 | Greene |
| 5,276,596 A | 1/1994 | Krenzel |
| 5,277,391 A | 1/1994 | Haug et al. |
| 5,286,071 A | 2/1994 | Storage |
| 5,288,110 A | 2/1994 | Allread |
| 5,294,054 A | 3/1994 | Benedict et al. |
| 5,297,735 A | 3/1994 | Heimann et al. |
| 5,297,739 A | 3/1994 | Allen |
| D345,811 S | 4/1994 | Van Deursen et al. |
| D346,426 S | 4/1994 | Warshawsky |
| D346,428 S | 4/1994 | Warshawsky |
| D346,430 S | 4/1994 | Warshawsky |
| D347,262 S | 5/1994 | Black et al. |
| D347,265 S | 5/1994 | Gottwald |
| 5,316,216 A | 5/1994 | Cammack et al. |
| D348,720 S | 7/1994 | Haug et al. |
| 5,329,650 A | 7/1994 | Zaccal et al. |
| D349,947 S | 8/1994 | Hing-Wah |
| 5,333,787 A | 8/1994 | Smith et al. |
| 5,333,789 A | 8/1994 | Garneys |
| 5,340,064 A | 8/1994 | Heimann et al. |
| 5,340,165 A | 8/1994 | Sheppard |
| D350,808 S | 9/1994 | Warshawsky |
| 5,344,080 A | 9/1994 | Matsui |
| 5,349,987 A | 9/1994 | Shieh |
| 5,356,076 A | 10/1994 | Bishop |

(56) References Cited

U.S. PATENT DOCUMENTS

| | | |
|---|---|---|
| 5,356,077 A | 10/1994 | Shames |
| D352,092 S | 11/1994 | Warshawsky |
| D352,347 S | 11/1994 | Dannenberg |
| D352,766 S | 11/1994 | Hill et al. |
| 5,368,235 A | 11/1994 | Drozdoff et al. |
| 5,369,556 A | 11/1994 | Zeller |
| 5,370,427 A | 12/1994 | Hoelle et al. |
| 5,385,500 A | 1/1995 | Schmidt |
| D355,242 S | 2/1995 | Warshawsky |
| D355,703 S | 2/1995 | Duell |
| D356,626 S | 3/1995 | Wang |
| 5,397,064 A | 3/1995 | Heitzman |
| 5,398,872 A | 3/1995 | Joubran |
| 5,398,977 A | 3/1995 | Berger et al. |
| 5,402,812 A | 4/1995 | Moineau et al. |
| 5,405,089 A | 4/1995 | Heimann et al. |
| 5,414,879 A | 5/1995 | Hiraishi et al. |
| 5,423,348 A | 6/1995 | Jezek et al. |
| 5,433,384 A | 7/1995 | Chan et al. |
| D361,399 S | 8/1995 | Carbone et al. |
| D361,623 S | 8/1995 | Huen |
| 5,441,075 A | 8/1995 | Clare |
| 5,449,206 A | 9/1995 | Lockwood |
| D363,360 S | 10/1995 | Santarsiero |
| 5,454,809 A | 10/1995 | Janssen |
| 5,468,057 A | 11/1995 | Megerle et al. |
| D364,935 S | 12/1995 | deBlois |
| D365,625 S | 12/1995 | Bova |
| D365,646 S | 12/1995 | deBlois |
| 5,476,225 A | 12/1995 | Chan |
| D366,309 S | 1/1996 | Huang |
| D366,707 S | 1/1996 | Kaiser |
| D366,708 S | 1/1996 | Santarsiero |
| D366,709 S | 1/1996 | Szymanski |
| D366,710 S | 1/1996 | Szymanskl |
| 5,481,765 A | 1/1996 | Wang |
| D366,948 S | 2/1996 | Carbone |
| D367,315 S | 2/1996 | Andrus |
| D367,333 S | 2/1996 | Swyst |
| D367,696 S | 3/1996 | Andrus |
| D367,934 S | 3/1996 | Carbone |
| D368,146 S | 3/1996 | Carbone |
| D368,317 S | 3/1996 | Swyst |
| 5,499,767 A | 3/1996 | Morand |
| D368,539 S | 4/1996 | Carbone et al. |
| D368,540 S | 4/1996 | Santarsiero |
| D368,541 S | 4/1996 | Kaiser et al. |
| D368,542 S | 4/1996 | deBlois et al. |
| D369,204 S | 4/1996 | Andrus |
| D369,205 S | 4/1996 | Andrus |
| 5,507,436 A | 4/1996 | Ruttenberg |
| D369,873 S | 5/1996 | deBlois et al. |
| D369,874 S | 5/1996 | Santarsiero |
| D369,875 S | 5/1996 | Carbone |
| D370,052 S | 5/1996 | Chan et al. |
| D370,250 S | 5/1996 | Fawcett et al. |
| D370,277 S | 5/1996 | Kaiser |
| D370,278 S | 5/1996 | Nolan |
| D370,279 S | 5/1996 | deBlois |
| D370,280 S | 5/1996 | Kaiser |
| D370,281 S | 5/1996 | Johnstone et al. |
| 5,517,392 A | 5/1996 | Rousso et al. |
| 5,521,803 A | 5/1996 | Eckert et al. |
| D370,542 S | 6/1996 | Santarsiero |
| D370,735 S | 6/1996 | deBlois |
| D370,987 S | 6/1996 | Santarsiero |
| D370,988 S | 6/1996 | Santarsiero |
| D371,448 S | 7/1996 | Santarsiero |
| D371,618 S | 7/1996 | Nolan |
| D371,619 S | 7/1996 | Szymanski |
| D371,856 S | 7/1996 | Carbone |
| D372,318 S | 7/1996 | Szymanskl |
| D372,319 S | 7/1996 | Carbone |
| 5,531,625 A | 7/1996 | Zhong |
| 5,539,624 A | 7/1996 | Dougherty |
| D372,548 S | 8/1996 | Carbone |
| D372,998 S | 8/1996 | Carbone |
| D373,210 S | 8/1996 | Santarsiero |
| 5,547,132 A | 8/1996 | Grogran |
| 5,547,374 A | 8/1996 | Coleman |
| D373,434 S | 9/1996 | Nolan |
| D373,435 S | 9/1996 | Nolan |
| D373,645 S | 9/1996 | Johnstone et al. |
| D373,646 S | 9/1996 | Szymanski et al. |
| D373,647 S | 9/1996 | Kaiser |
| D373,648 S | 9/1996 | Kaiser |
| D373,649 S | 9/1996 | Carbone |
| D373,651 S | 9/1996 | Szymanski |
| D373,652 S | 9/1996 | Kaiser |
| 5,551,637 A | 9/1996 | Lo |
| 5,552,973 A | 9/1996 | Hsu |
| 5,558,278 A | 9/1996 | Gallorini |
| D374,271 S | 10/1996 | Fleischmann |
| D374,297 S | 10/1996 | Kaiser |
| D374,298 S | 10/1996 | Swyst |
| D374,299 S | 10/1996 | Carbone |
| D374,493 S | 10/1996 | Szymanski |
| D374,494 S | 10/1996 | Santarsiero |
| D374,732 S | 10/1996 | Kaiser |
| D374,733 S | 10/1996 | Santasiero |
| 5,560,548 A | 10/1996 | Mueller et al. |
| 5,567,115 A | 10/1996 | Carbone |
| D375,541 S | 11/1996 | Michaluk |
| 5,577,664 A | 11/1996 | Heitzman |
| D376,217 S | 12/1996 | Kaiser |
| D376,860 S | 12/1996 | Santarsiero |
| D376,861 S | 12/1996 | Johnstone et al. |
| D376,862 S | 12/1996 | Carbone |
| 5,605,173 A | 2/1997 | Arnaud |
| D378,401 S | 3/1997 | Neufeld et al. |
| 5,613,638 A | 3/1997 | Blessing |
| 5,613,639 A | 3/1997 | Storm et al. |
| 5,615,837 A | 4/1997 | Roman |
| 5,624,074 A | 4/1997 | Parisi |
| 5,624,498 A | 4/1997 | Lee et al. |
| D379,212 S | 5/1997 | Chan |
| D379,404 S | 5/1997 | Spelts |
| 5,632,049 A | 5/1997 | Chen |
| D381,405 S | 7/1997 | Waidele et al. |
| D381,737 S | 7/1997 | Chan |
| D382,936 S | 8/1997 | Shfaram |
| 5,653,260 A | 8/1997 | Huber |
| 5,667,146 A | 9/1997 | Pimentel et al. |
| D385,332 S | 10/1997 | Andrus |
| D385,333 S | 10/1997 | Caroen et al. |
| D385,334 S | 10/1997 | Caroen et al. |
| D385,616 S | 10/1997 | Dow et al. |
| D385,947 S | 11/1997 | Dow et al. |
| D387,230 S | 12/1997 | von Buelow et al. |
| 5,697,557 A | 12/1997 | Blessing et al. |
| 5,699,964 A | 12/1997 | Bergmann et al. |
| 5,702,057 A | 12/1997 | Huber |
| D389,558 S | 1/1998 | Andrus |
| 5,704,080 A | 1/1998 | Kuhne |
| 5,707,011 A | 1/1998 | Bosio |
| 5,718,380 A | 2/1998 | Schorn et al. |
| D392,369 S | 3/1998 | Chan |
| 5,730,361 A | 3/1998 | Thonnes |
| 5,730,362 A | 3/1998 | Cordes |
| 5,730,363 A | 3/1998 | Kress |
| 5,742,961 A | 4/1998 | Casperson et al. |
| D394,490 S | 5/1998 | Andrus et al. |
| 5,746,375 A | 5/1998 | Guo |
| 5,749,552 A | 5/1998 | Fan |
| 5,749,602 A | 5/1998 | Delaney et al. |
| D394,899 S | 6/1998 | Caroen et al. |
| D395,074 S | 6/1998 | Neibrook et al. |
| D395,075 S | 6/1998 | Kolada |
| D395,142 S | 6/1998 | Neibrook |
| 5,764,760 A | 6/1998 | Grandbert et al. |
| 5,765,760 A | 6/1998 | Kuo |
| 5,769,802 A | 6/1998 | Wang |
| 5,772,120 A | 6/1998 | Huber |
| 5,778,939 A | 7/1998 | Hok-Yin |

(56) References Cited

U.S. PATENT DOCUMENTS

| | | |
|---|---|---|
| 5,788,157 A | 8/1998 | Kress |
| D398,370 S | 9/1998 | Purdy |
| 5,806,771 A | 9/1998 | Loschelder et al. |
| 5,819,791 A | 10/1998 | Chronister et al. |
| 5,820,574 A | 10/1998 | Henkin et al. |
| 5,823,431 A | 10/1998 | Pierce |
| 5,823,442 A | 10/1998 | Guo |
| 5,826,803 A | 10/1998 | Cooper |
| 5,830,666 A | 11/1998 | Heimann et al. |
| 5,833,138 A | 11/1998 | Crane et al. |
| D402,350 S | 12/1998 | Andrus |
| D403,754 S | 1/1999 | Gottwald |
| D404,116 S | 1/1999 | Boslo |
| 5,855,348 A | 1/1999 | Fornara |
| 5,860,599 A | 1/1999 | Lin |
| 5,862,543 A | 1/1999 | Reynoso et al. |
| 5,862,985 A | 1/1999 | Neibrook et al. |
| D405,502 S | 2/1999 | Tse |
| 5,865,375 A | 2/1999 | Hsu |
| 5,865,378 A | 2/1999 | Hollinshead et al. |
| 5,873,647 A | 2/1999 | Kurtz et al. |
| D408,893 S | 4/1999 | Tse |
| 5,894,959 A | 4/1999 | Sigurlidason |
| D409,276 S | 5/1999 | Ratzlatt |
| D410,276 S | 5/1999 | Ben-Tsur |
| 5,918,809 A | 7/1999 | Simmons |
| 5,918,811 A | 7/1999 | Denham et al. |
| D413,157 S | 8/1999 | Ratzlatt |
| 5,937,905 A | 8/1999 | Santos |
| 5,938,123 A | 8/1999 | Heitzman |
| 5,941,462 A | 8/1999 | Sandor |
| 5,947,388 A | 9/1999 | Woodruff |
| D415,247 S | 10/1999 | Haverstraw et al. |
| 5,961,046 A | 10/1999 | Joubran |
| 5,964,419 A | 10/1999 | Lovett ............ B05B 1/20 239/532 |
| 5,967,417 A | 10/1999 | Mantel |
| 5,979,776 A | 11/1999 | Williams |
| 5,992,762 A | 11/1999 | Wang |
| D418,200 S | 12/1999 | Ben-Tsur |
| 5,997,047 A | 12/1999 | Pimentel et al. |
| 6,003,165 A | 12/1999 | Loyd |
| D418,902 S | 1/2000 | Haverstraw et al. |
| D418,903 S | 1/2000 | Haverstraw et al. |
| D418,904 S | 1/2000 | Milrud |
| 6,016,975 A | 1/2000 | Amaduzzi |
| D421,099 S | 2/2000 | Mullenmeister |
| 6,021,960 A | 2/2000 | Kehat |
| D422,053 S | 3/2000 | Brenner et al. |
| 6,042,027 A | 3/2000 | Sandvik |
| 6,042,155 A | 3/2000 | Lockwood |
| D422,336 S | 4/2000 | Haverstraw et al. |
| D422,337 S | 4/2000 | Chan |
| D423,083 S | 4/2000 | Haug et al. |
| D423,110 S | 4/2000 | Cipkowski |
| D424,160 S | 5/2000 | Haug et al. |
| D424,161 S | 5/2000 | Haug et al. |
| D424,162 S | 5/2000 | Haug et al. |
| D424,163 S | 5/2000 | Haug et al. |
| D426,290 S | 6/2000 | Haug et al. |
| 6,079,640 A | 6/2000 | Merritts ............ B05B 1/20 239/532 |
| D427,661 S | 7/2000 | Haverstraw et al. |
| D428,110 S | 7/2000 | Haug et al. |
| D428,125 S | 7/2000 | Chan |
| 6,085,780 A | 7/2000 | Morris |
| D430,267 S | 8/2000 | Milrud et al. |
| 6,095,801 A | 8/2000 | Spiewak |
| D430,643 S | 9/2000 | Tse |
| 6,113,002 A | 9/2000 | Finkbeiner |
| 6,123,272 A | 9/2000 | Havican et al. |
| 6,123,308 A | 9/2000 | Faisst |
| D432,624 S | 10/2000 | Chan |
| D432,625 S | 10/2000 | Chan |
| D433,096 S | 10/2000 | Tse |
| D433,097 S | 10/2000 | Tse |
| 6,126,091 A | 10/2000 | Heitzman |
| 6,126,290 A | 10/2000 | Veigel |
| D434,109 S | 11/2000 | Ko |
| 6,164,569 A | 12/2000 | Hollinshead et al. |
| 6,164,570 A | 12/2000 | Smeltzer |
| D435,889 S | 1/2001 | Ben-Tsur et al. |
| D439,305 S | 3/2001 | Slothower |
| 6,199,580 B1 | 3/2001 | Morris |
| 6,202,679 B1 | 3/2001 | Titus |
| D440,276 S | 4/2001 | Slothower |
| D440,277 S | 4/2001 | Slothower |
| D440,278 S | 4/2001 | Slothower |
| D441,059 S | 4/2001 | Fleischmann |
| 6,209,799 B1 | 4/2001 | Finkbeiner |
| D443,025 S | 5/2001 | Kollmann et al. |
| D443,026 S | 5/2001 | Kollmann et al. |
| D443,027 S | 5/2001 | Kollmann et al. |
| D443,029 S | 5/2001 | Kollmann et al. |
| 6,223,998 B1 | 5/2001 | Heitzman |
| 6,230,984 B1 | 5/2001 | Jager |
| 6,230,988 B1 | 5/2001 | Chao et al. |
| 6,230,989 B1 | 5/2001 | Haverstraw et al. |
| D443,335 S | 6/2001 | Andrus |
| D443,336 S | 6/2001 | Kollmann et al. |
| D443,347 S | 6/2001 | Gottwald |
| 6,241,166 B1 | 6/2001 | Overington et al. |
| 6,250,572 B1 | 6/2001 | Chen |
| D444,846 S | 7/2001 | Cross |
| D444,865 S | 7/2001 | Gottwald |
| D445,871 S | 7/2001 | Fan |
| 6,254,014 B1 | 7/2001 | Clearman et al. |
| 6,270,278 B1 | 8/2001 | Mauro |
| 6,276,004 B1 | 8/2001 | Bertrand et al. |
| 6,283,447 B1 | 9/2001 | Fleet |
| 6,286,764 B1 | 9/2001 | Garvey et al. |
| D449,673 S | 10/2001 | Kollmann et al. |
| D450,370 S | 11/2001 | Wales et al. |
| D450,805 S | 11/2001 | Lindholm et al. |
| D450,806 S | 11/2001 | Lindholm et al. |
| D450,807 S | 11/2001 | Lindholm et al. |
| D451,169 S | 11/2001 | Lindholm et al. |
| D451,170 S | 11/2001 | Lindholm et al. |
| D451,171 S | 11/2001 | Lindholm et al. |
| D451,172 S | 11/2001 | Lindholm et al. |
| 6,321,777 B1 | 11/2001 | Wu |
| 6,322,006 B1 | 11/2001 | Guo |
| D451,583 S | 12/2001 | Lindholm et al. |
| D451,980 S | 12/2001 | Lindholm et al. |
| D452,553 S | 12/2001 | Lindholm et al. |
| D452,725 S | 1/2002 | Lindholm et al. |
| D452,897 S | 1/2002 | Gillette et al. |
| 6,336,764 B1 | 1/2002 | Liu |
| 6,338,170 B1 | 1/2002 | De Simone |
| D453,369 S | 2/2002 | Lobermeier |
| D453,370 S | 2/2002 | Lindholm et al. |
| D453,551 S | 2/2002 | Lindholm et al. |
| 6,349,735 B2 | 2/2002 | Gul |
| D454,617 S | 3/2002 | Curbbun et al. |
| D454,938 S | 3/2002 | Lord |
| 6,375,342 B1 | 4/2002 | Koren et al. |
| D457,937 S | 5/2002 | Lindholm et al. |
| 6,382,531 B1 | 5/2002 | Tracy |
| D458,348 S | 6/2002 | Mullenmeister |
| 6,412,711 B1 | 7/2002 | Fan |
| D461,224 S | 8/2002 | Lobermeier |
| D461,878 S | 8/2002 | Green et al. |
| 6,450,425 B1 | 9/2002 | Chen |
| 6,454,186 B2 | 9/2002 | Haverstraw et al. |
| D463,843 S | 10/2002 | Howell |
| 6,463,658 B1 | 10/2002 | Larsson |
| 6,464,265 B1 | 10/2002 | Mikol |
| D465,552 S | 11/2002 | Tse |
| D465,553 S | 11/2002 | Singtoroj |
| 6,484,952 B2 | 11/2002 | Koren |
| D468,800 S | 1/2003 | Tse |
| D469,165 S | 1/2003 | Lim |
| 6,502,796 B1 | 1/2003 | Wales |
| 6,508,415 B2 | 1/2003 | Wang |

(56) References Cited

U.S. PATENT DOCUMENTS

| | | |
|---|---|---|
| 6,511,001 B1 | 1/2003 | Huang |
| D470,219 S | 2/2003 | Schweitzer |
| 6,516,070 B2 | 2/2003 | Macey |
| D471,253 S | 3/2003 | Tse |
| D471,953 S | 3/2003 | Colligan et al. |
| 6,533,194 B2 | 3/2003 | Marsh et al. |
| 6,537,455 B2 | 3/2003 | Farley |
| D472,958 S | 4/2003 | Ouyoung |
| 6,550,697 B2 | 4/2003 | Lai |
| 6,585,174 B1 | 7/2003 | Huang |
| 6,595,439 B1 | 7/2003 | Chen |
| 6,607,148 B1 | 8/2003 | Marsh et al. |
| 6,611,971 B1 | 9/2003 | Antoniello et al. |
| 6,637,676 B2 | 10/2003 | Zieger et al. |
| 6,641,057 B2 | 11/2003 | Thomas et al. |
| D483,837 S | 12/2003 | Fan |
| 6,659,117 B2 | 12/2003 | Gilmore |
| 6,659,372 B2 | 12/2003 | Marsh et al. |
| D485,887 S | 1/2004 | Luettgen et al. |
| D486,888 S | 2/2004 | Lobermeier |
| 6,691,338 B2 | 2/2004 | Zieger |
| 6,691,933 B1 | 2/2004 | Bosio |
| D487,301 S | 3/2004 | Haug et al. |
| D487,498 S | 3/2004 | Blomstrom |
| 6,701,953 B2 | 3/2004 | Agosta |
| 6,715,699 B1 | 4/2004 | Greenberg et al. |
| 6,719,218 B2 | 4/2004 | Cool et al. |
| D489,798 S | 5/2004 | Hunt |
| D490,498 S | 5/2004 | Golichowski |
| 6,736,336 B2 | 5/2004 | Wong |
| 6,739,523 B2 | 5/2004 | Haverstraw et al. |
| 6,739,527 B1 | 5/2004 | Chung |
| D492,004 S | 6/2004 | Haug et al. |
| D492,007 S | 6/2004 | Kollmann et al. |
| 6,742,725 B1 | 6/2004 | Fan |
| D493,208 S | 7/2004 | Lin |
| D493,864 S | 8/2004 | Haug et al. |
| D494,655 S | 8/2004 | Lin |
| D494,661 S | 8/2004 | Zieger et al. |
| D495,027 S | 8/2004 | Mazzola |
| 6,776,357 B1 | 8/2004 | Naito |
| 6,789,751 B1 | 9/2004 | Fan |
| D496,987 S | 10/2004 | Glunk |
| D497,974 S | 11/2004 | Haug et al. |
| D498,514 S | 11/2004 | Haug et al. |
| D500,121 S | 12/2004 | Blomstrom |
| 6,827,039 B1 | 12/2004 | Nelson |
| D500,549 S | 1/2005 | Blomstrom |
| D501,242 S | 1/2005 | Blomstrom |
| D502,760 S | 3/2005 | Zieger et al. |
| D502,761 S | 3/2005 | Zieger et al. |
| D503,211 S | 3/2005 | Lin |
| D503,463 S | 3/2005 | Hughes et al. |
| 6,863,227 B2 | 3/2005 | Wollenberg et al. |
| 6,869,030 B2 | 3/2005 | Blessing et al. |
| D503,774 S | 4/2005 | Zieger |
| D503,775 S | 4/2005 | Zieger |
| D503,966 S | 4/2005 | Zieger |
| 6,899,292 B2 | 5/2005 | Titinet |
| D506,243 S | 6/2005 | Wu |
| D507,037 S | 7/2005 | Wu |
| 6,935,581 B2 | 8/2005 | Titinet |
| D509,280 S | 9/2005 | Bailey et al. |
| D509,563 S | 9/2005 | Bailey et al. |
| D510,123 S | 9/2005 | Tsai |
| D511,809 S | 11/2005 | Haug et al. |
| D512,119 S | 11/2005 | Haug et al. |
| 6,981,661 B1 | 1/2006 | Chen |
| D516,169 S | 2/2006 | Wu |
| 7,000,854 B2 | 2/2006 | Malek et al. |
| 7,004,409 B2 | 2/2006 | Okubo |
| 7,004,410 B2 | 2/2006 | Li |
| D520,109 S | 5/2006 | Wu |
| 7,040,554 B2 | 5/2006 | Drennow |
| 7,044,137 B2 | 5/2006 | Glucksman |
| 7,048,210 B2 | 5/2006 | Clark |
| 7,055,767 B1 | 6/2006 | Ko |
| D525,341 S | 7/2006 | Bossini |
| 7,070,125 B2 | 7/2006 | Williams et al. |
| 7,077,342 B2 | 7/2006 | Lee |
| D527,440 S | 8/2006 | Macan |
| 7,093,780 B1 | 8/2006 | Chung |
| 7,097,122 B1 | 8/2006 | Farley |
| D527,790 S | 9/2006 | Hughes et al. |
| D528,631 S | 9/2006 | Gillette et al. |
| 7,100,845 B1 | 9/2006 | Hsieh |
| 7,111,708 B2 | 9/2006 | Thomas et al. |
| 7,111,795 B2 | 9/2006 | Thong |
| D529,986 S | 10/2006 | Chan |
| D530,389 S | 10/2006 | Glenslak et al. |
| D530,392 S | 10/2006 | Tse |
| D531,259 S | 10/2006 | Hsieh |
| 7,114,666 B2 | 10/2006 | Luettgen et al. |
| D533,253 S | 12/2006 | Luettgen et al. |
| D534,239 S | 12/2006 | Dingler et al. |
| D535,354 S | 1/2007 | Wu |
| D536,060 S | 1/2007 | Sadler |
| 7,156,325 B1 | 1/2007 | Chen |
| 7,182,043 B1 | 2/2007 | Nelson |
| D538,391 S | 3/2007 | Mazzola |
| D538,395 S | 3/2007 | Starck |
| D540,424 S | 4/2007 | Kirar |
| D540,425 S | 4/2007 | Endo et al. |
| D540,426 S | 4/2007 | Cropelli |
| D540,427 S | 4/2007 | Bouroullec et al. |
| D542,391 S | 5/2007 | Gilbert |
| D542,393 S | 5/2007 | Haug et al. |
| D544,573 S | 6/2007 | Dingler et al. |
| 7,229,031 B2 | 6/2007 | Schmidt |
| 7,243,863 B2 | 7/2007 | Glunk |
| 7,246,760 B2 | 7/2007 | Marty et al. |
| D552,713 S | 10/2007 | Rexach |
| 7,278,591 B2 | 10/2007 | Clearman et al. |
| D556,295 S | 11/2007 | Genord et al. |
| 7,299,510 B2 | 11/2007 | Tsai |
| D557,763 S | 12/2007 | Schonherr et al. |
| D557,764 S | 12/2007 | Schonherr et al. |
| D557,765 S | 12/2007 | Schonherr et al. |
| D557,766 S | 12/2007 | Hoernig |
| D558,301 S | 12/2007 | Hoernig |
| 7,303,151 B2 | 12/2007 | Wu |
| D559,357 S | 1/2008 | Wang et al. |
| D559,945 S | 1/2008 | Patterson et al. |
| D560,269 S | 1/2008 | Tse |
| D562,937 S | 2/2008 | Schonherr et al. |
| D562,938 S | 2/2008 | Blessing |
| D562,941 S | 2/2008 | Pan |
| 7,331,536 B1 | 2/2008 | Zhen et al. |
| 7,347,388 B2 | 3/2008 | Chung |
| D565,699 S | 4/2008 | Berberet |
| D565,702 S | 4/2008 | Daunter et al. |
| D565,703 S | 4/2008 | Lammel et al. |
| D566,228 S | 4/2008 | Neagoe |
| D566,229 S | 4/2008 | Rexach |
| D567,328 S | 4/2008 | Spangler et al. |
| D567,335 S | 4/2008 | Huang |
| 7,360,723 B2 | 4/2008 | Lev |
| 7,364,097 B2 | 4/2008 | Okuma |
| 7,374,112 B1 | 5/2008 | Bulan et al. |
| 7,384,007 B2 | 6/2008 | Ho |
| D575,845 S | 8/2008 | Lobermeier ................. D23/223 |
| D577,099 S | 9/2008 | Leber |
| D577,793 S | 9/2008 | Leber |
| D578,604 S | 10/2008 | Wu et al. |
| D578,605 S | 10/2008 | Wu et al. |
| D578,608 S | 10/2008 | Wu et al. |
| D580,012 S | 11/2008 | Quinn et al. |
| D580,513 S | 11/2008 | Quinn et al. |
| D581,013 S | 11/2008 | Citterio |
| D581,014 S | 11/2008 | Quinn et al. |
| D581,485 S | 11/2008 | Kollmann et al. |
| D586,426 S | 2/2009 | Schoenherr et al. |
| 7,503,345 B2 | 3/2009 | Paterson et al. |
| D590,048 S | 4/2009 | Leber et al. |

(56) References Cited

U.S. PATENT DOCUMENTS

| | | | |
|---|---|---|---|
| 7,520,448 B2 | 4/2009 | Luettgen et al. |
| D592,276 S | 5/2009 | Shoenherr et al. |
| D592,278 S | 5/2009 | Leber |
| 7,537,175 B2 | 5/2009 | Miura et al. |
| 7,578,453 B1 | 8/2009 | Wilson |
| D599,883 S | 9/2009 | Tippens |
| D600,777 S | 9/2009 | Whitaker et al. |
| D603,935 S | 11/2009 | Leber |
| D604,392 S | 11/2009 | Schoenherr et al. |
| 7,617,990 B2 | 11/2009 | Huffman |
| D605,731 S | 12/2009 | Leber |
| D606,623 S | 12/2009 | Whitaker et al. |
| D606,626 S | 12/2009 | Zore |
| D608,412 S | 1/2010 | Barnard et al. |
| D608,413 S | 1/2010 | Barnard et al. |
| D616,061 S | 5/2010 | Whitaker et al. |
| 7,721,979 B2 | 5/2010 | Mazzola |
| D617,419 S | 6/2010 | Lee |
| D617,873 S | 6/2010 | Lee |
| 7,740,186 B2 | 6/2010 | Macan et al. |
| D621,904 S | 8/2010 | Yoo et al. |
| D621,905 S | 8/2010 | Yoo et al. |
| 7,770,820 B2 | 8/2010 | Clearman et al. |
| 7,770,822 B2 | 8/2010 | Leber |
| D624,156 S | 9/2010 | Leber |
| 7,789,326 B2 | 9/2010 | Luettgen et al. |
| D625,776 S | 10/2010 | Williams |
| 7,832,662 B2 | 11/2010 | Gallo |
| D628,676 S | 12/2010 | Lee |
| D629,867 S | 12/2010 | Rexach et al. |
| 7,871,020 B2 | 1/2011 | Nelson et al. |
| D633,174 S | 2/2011 | Lee |
| D637,694 S | 5/2011 | Lammel et al. |
| D641,830 S | 7/2011 | Alexander |
| D641,831 S | 7/2011 | Williams |
| 7,992,807 B2 | 8/2011 | Pan |
| 8,020,787 B2 | 9/2011 | Leber |
| 8,020,788 B2 | 9/2011 | Luettgen et al. |
| 8,028,935 B2 | 10/2011 | Leber |
| D652,108 S | 1/2012 | Eads |
| D652,109 S | 1/2012 | Nichols |
| D652,110 S | 1/2012 | Nichols |
| D652,114 S | 1/2012 | Yoo |
| D652,894 S | 1/2012 | Nichols |
| 8,109,450 B2 | 2/2012 | Luettgen et al. |
| D655,388 S | 3/2012 | Schoenherr et al. |
| D655,389 S | 3/2012 | Schoenherr et al. |
| D656,219 S | 3/2012 | Su |
| D656,582 S | 3/2012 | Flowers et al. |
| 8,132,745 B2 | 3/2012 | Leber et al. |
| 8,146,838 B2 | 4/2012 | Luettgen et al. |
| D660,940 S | 5/2012 | Flowers et al. |
| 8,220,726 B2 | 7/2012 | Qui et al. |
| D667,531 S | 9/2012 | Romero et al. |
| D669,158 S | 10/2012 | Flowers et al. |
| 8,292,200 B2 | 10/2012 | Macan et al. |
| 8,297,534 B2 | 10/2012 | Li et al. |
| D672,433 S | 12/2012 | Yoo et al. |
| D673,649 S | 1/2013 | Quinn et al. |
| D673,650 S | 1/2013 | Chibitty |
| D674,047 S | 1/2013 | Yoo et al. |
| D674,050 S | 1/2013 | Quinn et al. |
| 8,348,181 B2 | 1/2013 | Whitaker |
| 8,366,024 B2 | 2/2013 | Leber |
| D678,463 S | 3/2013 | Quinn et al. |
| D678,467 S | 3/2013 | Quinn et al. |
| 8,640,973 B2 | 2/2014 | Gansebom |
| 8,967,497 B2 | 3/2015 | Luettgen ............ B05B 1/1663 239/581.1 |
| 8,991,730 B2 | 3/2015 | Kah, Jr. et al. |
| D731,026 S | 6/2015 | Bahler |
| D737,931 S | 9/2015 | Schoenherr |
| D744,612 S | 12/2015 | Peterson |
| 9,295,997 B2 | 3/2016 | Harwanko et al. |
| D753,794 S | 4/2016 | Starck |
| D755,346 S | 5/2016 | Yan |
| 9,387,493 B2 | 7/2016 | Lev |
| 9,399,860 B2 | 7/2016 | Lev |
| D765,222 S | 8/2016 | Norris, Jr. |
| D778,402 S | 2/2017 | Schoenherr |
| D778,403 S | 2/2017 | Schoenherr |
| D778,404 S | 2/2017 | Schoenherr |
| 9,566,593 B2 | 2/2017 | Marty et al. |
| D787,634 S | 5/2017 | Eads |
| D793,529 S | 8/2017 | Garland |
| 9,744,548 B2 | 8/2017 | Gopalarao et al. |
| D803,981 S | 11/2017 | Thurgood |
| D811,523 S | 2/2018 | Andrew |
| D828,906 S | 9/2018 | Lu et al. |
| D832,975 S | 11/2018 | Garuti et al. |
| D843,549 S | 3/2019 | Thurgood |
| D872,227 S | 1/2020 | Ladwig et al. |
| D875,210 S | 2/2020 | Thurgood |
| D912,767 S | 3/2021 | Ladwig et al. |
| 11,413,632 B2 * | 8/2022 | Thurgood ............ A01K 13/001 |
| 2001/0042797 A1 | 11/2001 | Shrigley |
| 2002/0109023 A1 | 8/2002 | Thomas et al. |
| 2003/0042332 A1 | 3/2003 | Lai |
| 2003/0062426 A1 | 4/2003 | Gregory et al. |
| 2003/0121993 A1 | 7/2003 | Haverstraw et al. |
| 2004/0074993 A1 | 4/2004 | Thomas et al. |
| 2004/0118949 A1 | 6/2004 | Marks |
| 2004/0217209 A1 | 11/2004 | Bui |
| 2004/0244105 A1 | 12/2004 | Tsai |
| 2005/0001072 A1 | 1/2005 | Bolus et al. |
| 2005/0284967 A1 | 12/2005 | Korb |
| 2006/0016908 A1 | 1/2006 | Chung |
| 2006/0016913 A1 | 1/2006 | Lo |
| 2006/0102747 A1 | 5/2006 | Ho |
| 2006/0163391 A1 | 7/2006 | Schorn |
| 2006/0219822 A1 | 10/2006 | Miller et al. |
| 2006/0272086 A1 | 12/2006 | Mesa |
| 2007/0040054 A1 | 2/2007 | Farzan |
| 2007/0200013 A1 | 8/2007 | Hsiao |
| 2007/0246577 A1 | 10/2007 | Leber |
| 2007/0252021 A1 | 11/2007 | Cristina |
| 2007/0272770 A1 | 11/2007 | Leber et al. |
| 2008/0073449 A1 | 3/2008 | Haynes et al. |
| 2008/0083844 A1 | 4/2008 | Leber et al. |
| 2008/0121293 A1 | 5/2008 | Leber et al. |
| 2008/0156897 A1 | 7/2008 | Leber |
| 2008/0223957 A1 | 9/2008 | Schorn |
| 2008/0272591 A1 | 11/2008 | Leber |
| 2009/0039181 A1 | 2/2009 | Auer, Jr. |
| 2009/0200404 A1 | 8/2009 | Cristina |
| 2009/0218420 A1 | 9/2009 | Mazzola |
| 2009/0307836 A1 | 12/2009 | Blattner et al. |
| 2009/0308951 A1 | 12/2009 | Suter |
| 2010/0127096 A1 | 5/2010 | Leber |
| 2011/0000983 A1 | 1/2011 | Chang |
| 2011/0011953 A1 | 1/2011 | Macan et al. |
| 2011/0121098 A1 | 5/2011 | Luettgen et al. |
| 2012/0048968 A1 | 3/2012 | Williams |
| 2012/0222207 A1 | 9/2012 | Slothower et al. |
| 2013/0126646 A1 | 5/2013 | Wu |
| 2013/0147186 A1 | 6/2013 | Leber |
| 2014/0252138 A1 | 9/2014 | Wischstadt et al. |
| 2014/0367482 A1 | 12/2014 | Cacka |
| 2015/0165452 A1 | 6/2015 | Luettgen et al. |
| 2015/0211728 A1 | 12/2015 | Zhadanov |
| 2016/0015000 A1 | 1/2016 | Diez |
| 2017/0216854 A1 * | 8/2017 | Thurgood ............ B05B 1/3026 |
| 2018/0065131 A1 | 3/2018 | Rogers et al. |

FOREIGN PATENT DOCUMENTS

| | | |
|---|---|---|
| CA | 2774670 | 5/2016 |
| CH | 234284 | 3/1963 |
| CN | 200920182881 | 9/2009 |
| CN | 201940296 U | 8/2011 |
| CN | 201230021930 | 2/2012 |
| CN | 201530310992 | 8/2015 |
| CN | 201730640606.6 | 9/2018 |
| CN | ZL201830585334.9 | 3/2019 |

(56) References Cited

FOREIGN PATENT DOCUMENTS

| | | |
|---|---|---|
| DE | 352813 | 5/1922 |
| DE | 848627 | 9/1952 |
| DE | 854100 | 10/1952 |
| DE | 2360534 | 6/1974 |
| DE | 2806093 | 8/1979 |
| DE | 3107808 | 9/1982 |
| DE | 3246327 | 6/1984 |
| DE | 3440901 | 7/1985 |
| DE | 3706320 | 3/1988 |
| DE | 8804236 | 6/1988 |
| DE | 4034695 | 5/1991 |
| DE | 19608085 | 9/1996 |
| DE | 10034818 A1 | 1/2002 |
| DE | 202005000881 | 3/2005 |
| DE | 102006032017 | 1/2008 |
| DE | 202008009530 | 9/2008 |
| DE | 202013101201 | 3/2013 |
| EP | 0167063 | 6/1985 |
| EP | 0478999 | 4/1992 |
| EP | 0514753 | 11/1992 |
| EP | 0435030 | 7/1993 |
| EP | 0617644 | 10/1994 |
| EP | 0683354 | 11/1995 |
| EP | 0687851 | 12/1995 |
| EP | 0695907 | 2/1996 |
| EP | 0700729 | 3/1996 |
| EP | 0719588 | 7/1996 |
| EP | 0721082 | 7/1996 |
| EP | 0733747 | 9/1996 |
| EP | 0808661 | 11/1997 |
| EP | 0726811 | 1/1998 |
| EP | 2164642 | 10/2010 |
| EP | 2260945 | 12/2010 |
| FR | 538538 | 6/1922 |
| FR | 873808 | 7/1942 |
| FR | 1039750 | 10/1953 |
| FR | 1098836 | 8/1955 |
| FR | 2591099 | 6/1987 |
| FR | 2596492 | 10/1987 |
| FR | 2695452 | 3/1994 |
| GB | 10086 | 4/1894 |
| GB | 3314 | 12/1914 |
| GB | 129812 | 7/1919 |
| GB | 204600 | 10/1923 |
| GB | 634483 | 3/1950 |
| GB | 971866 | 10/1964 |
| GB | 1111126 | 4/1968 |
| GB | 2066074 | 1/1980 |
| GB | 2066704 | 7/1981 |
| GB | 2068778 | 8/1981 |
| GB | 2121319 | 12/1983 |
| GB | 2155984 | 10/1985 |
| GB | 2156932 A | 10/1985 |
| GB | 2199771 | 7/1988 |
| GB | 2298595 | 11/1996 |
| GB | 2337471 | 11/1999 |
| IT | 327400 | 7/1935 |
| IT | 350359 | 7/1937 |
| IT | 563459 | 5/1957 |
| JP | S63-181459 | 11/1988 |
| JP | H2-78660 | 6/1990 |
| JP | 4062238 | 2/1992 |
| JP | 4146708 | 5/1992 |
| NL | 8902957 | 6/1991 |
| WO | WO93/12894 | 7/1993 |
| WO | WO93/25839 | 12/1993 |
| WO | WO96/00617 | 1/1996 |
| WO | WO98/30336 | 7/1998 |
| WO | WO99/59726 | 11/1999 |
| WO | WO00/10720 | 3/2000 |
| WO | WO08/082699 | 7/2008 |
| WO | WO10/04593 | 1/2010 |

OTHER PUBLICATIONS

Color Copy, Labeled 1A, Gemlo, available at least as early as Dec. 2, 1998.
Color Copy, Labeled 1B, Gemlo, available at least as early as Dec. 2, 1998.
International Search Report, PCT/US07/88962, 9 pages, dated Jun. 10, 2008.
International Search Report, PCT/US07/67141, 8 pages, dated Jul. 2, 2008.
EZ Wash Wand, accessed at least as early as Feb. 2016, http://www.ezwashwand.com.
WashWands, accessed at least as early as Feb. 2016, http://www.washwand.com.
Woof Washer, accessed at least as early as Feb. 2016, http://www.woofwasher.com.
U.S. Appl. No. 16/565,103, filed Sep. 9, 2019.
U.S. Appl. No. 15/422,450, filed Feb. 1, 2017.

\* cited by examiner

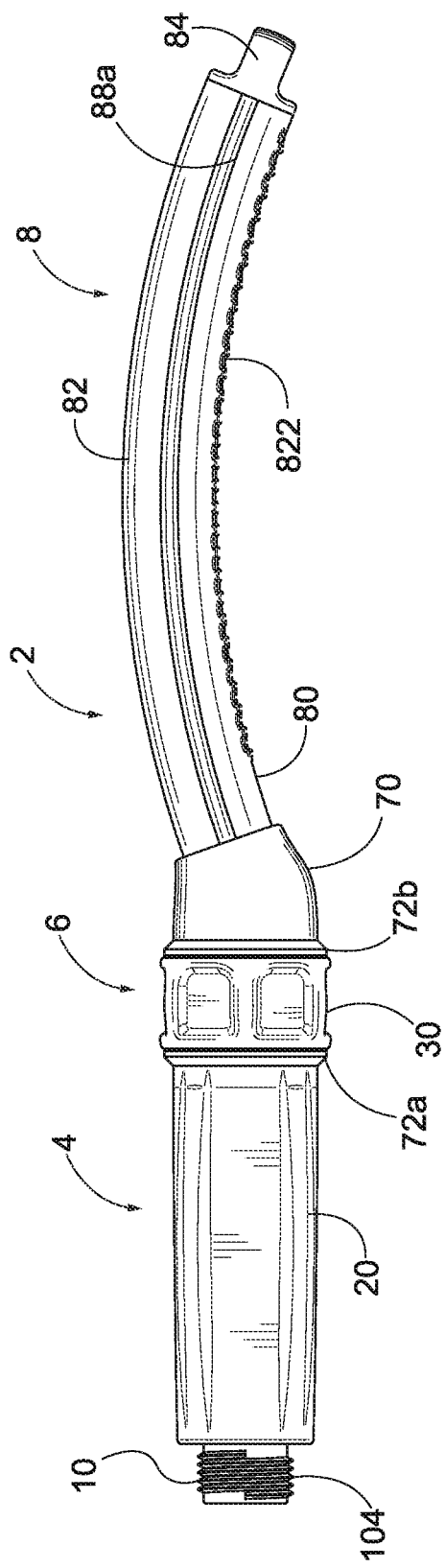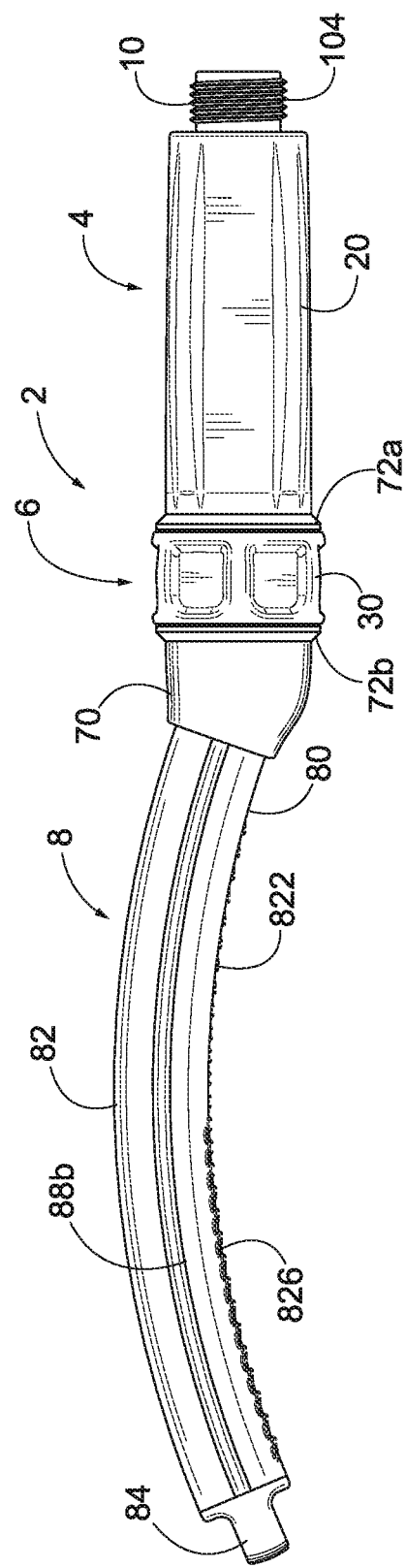
FIG. 1B
FIG. 1C

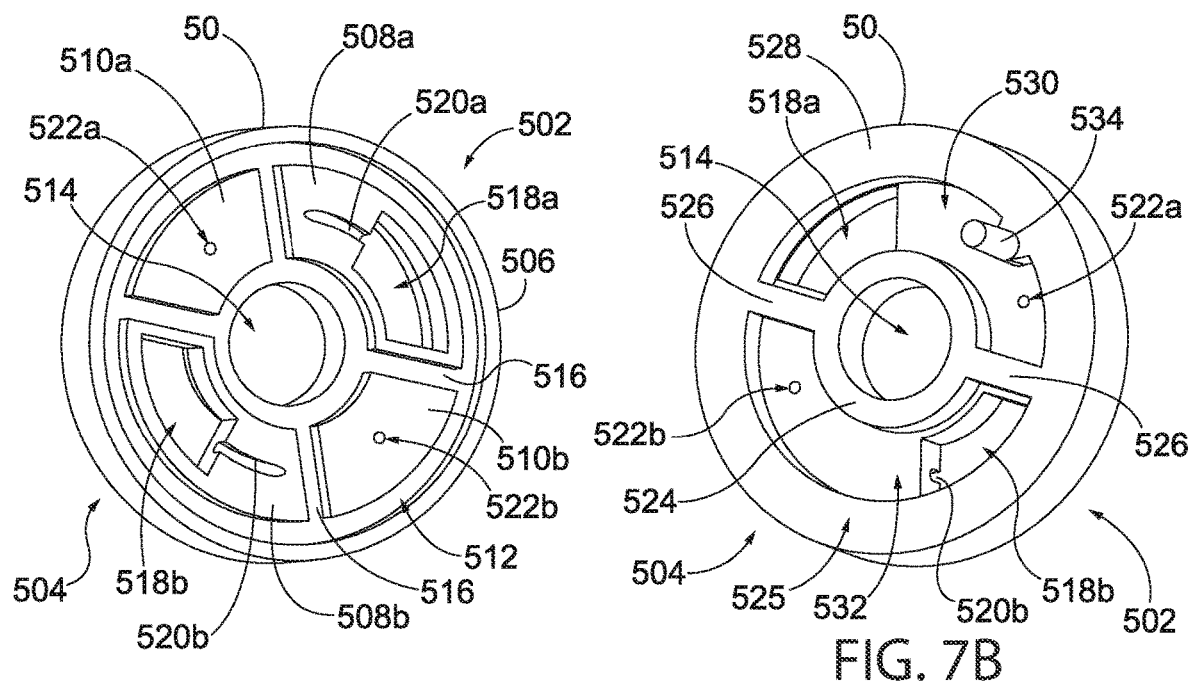
FIG. 7A
FIG. 7B
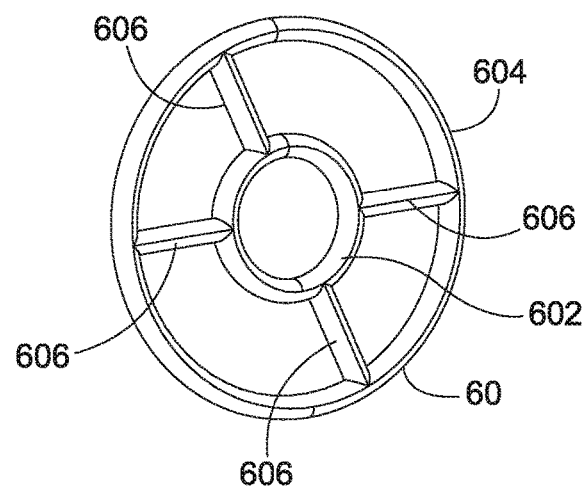
FIG. 8

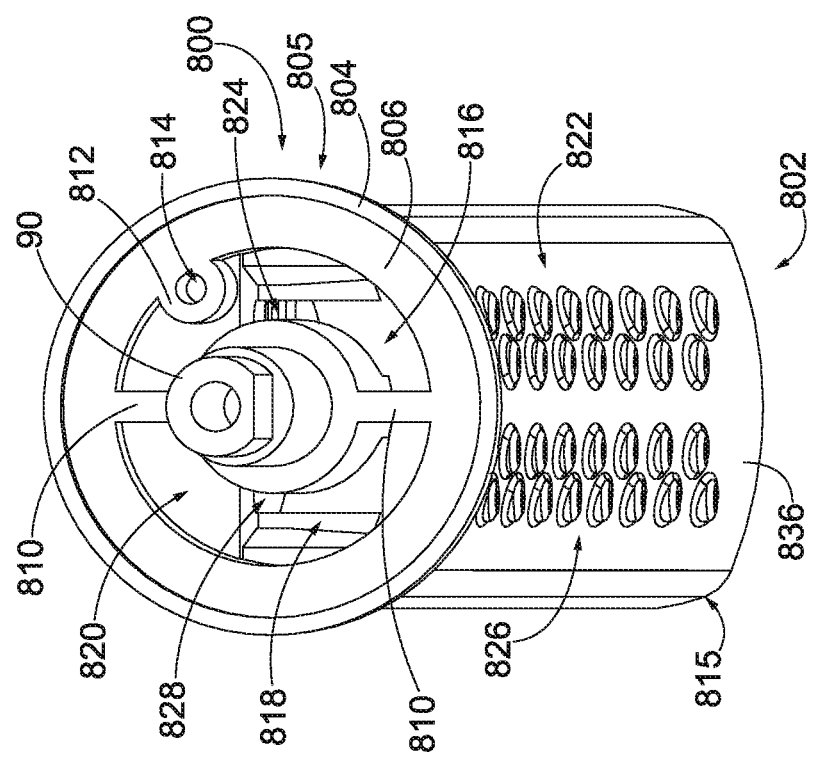
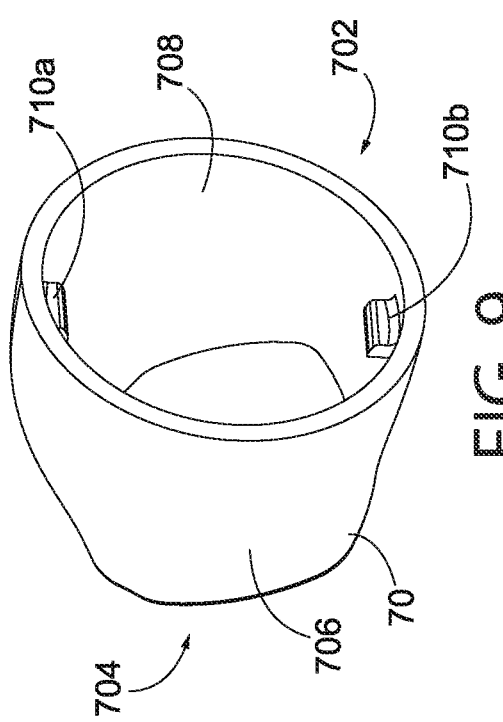
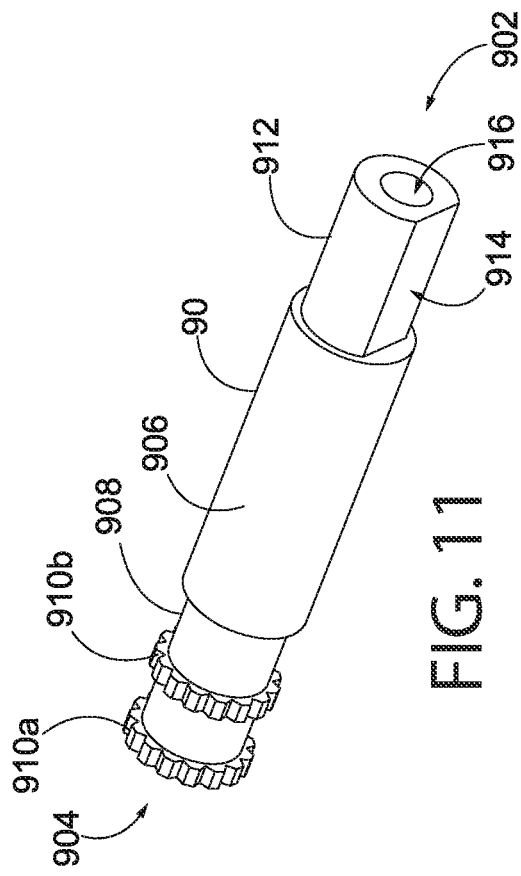

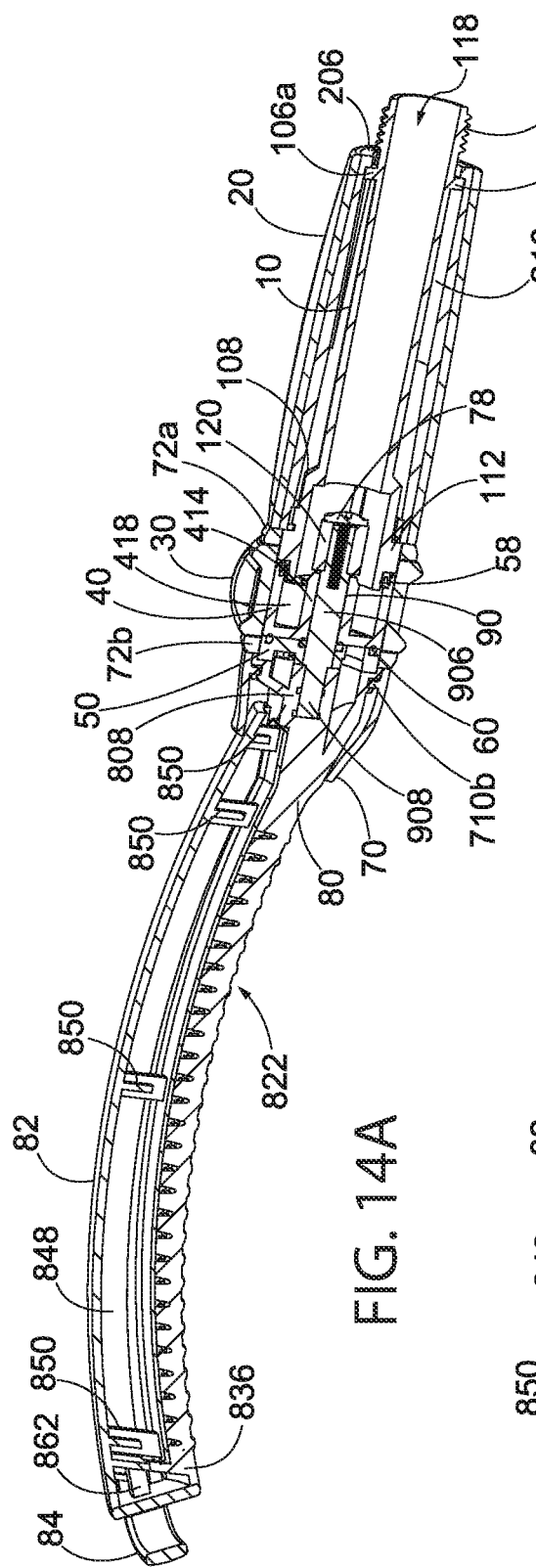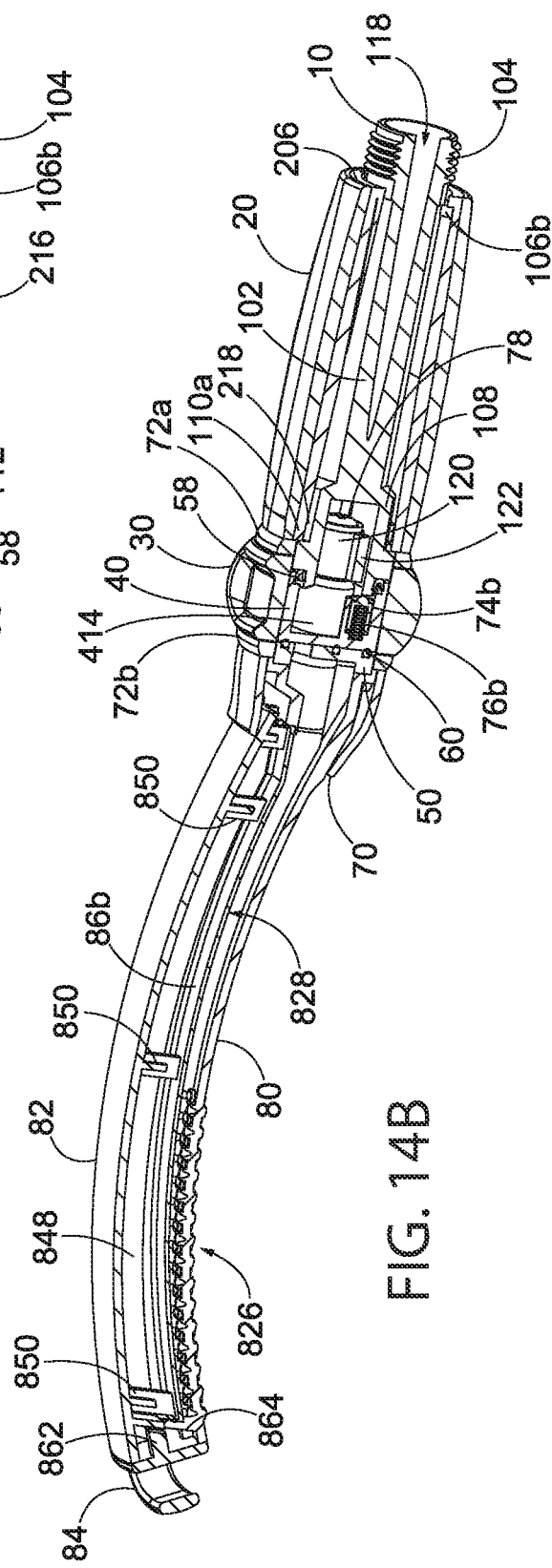

HANDHELD SHOWERHEAD WITH LINEAR NOZZLE ARRAYS

CROSS REFERENCE TO RELATED APPLICATIONS

This application is a continuation of U.S. non-provisional application Ser. No. 16/565,103 entitled "Handheld Showerhead with Linear Nozzle Arrays," filed on 9 Sep. 2019, which is a continuation of U.S. non-provisional application Ser. No. 15/422,450 entitled "Handheld Pet Spray Wand," filed on 1 Feb. 2017, which claims the benefit of priority pursuant to 35 U.S.C. § 119(e) of U.S. provisional application No. 62/289,833 filed 1 Feb. 2016 entitled "Handheld Pet Spray Wand" and U.S. provisional application No. 62/289,855 filed 1 Feb. 2016 entitled "Handheld Pet Spray Wand," each of which is hereby incorporated herein by reference in its entirety.

TECHNICAL FIELD

The technology described herein relates to a handheld water spray device and, more specifically, to a handheld spray wand for particular use with pets.

BACKGROUND

Pets get dirty, especially dogs. It is desirable to bathe dirty pets on occasion, especially pets that are allowed indoors with their human companions. Handheld sink and shower sprays are designed to meet particular human needs such as washing dishes or human bathing. However, the designs of these handheld sprayers have not taken into consideration the unique needs and circumstances of washing a pet.

The information included in this Background section of the specification, including any references cited herein and any description or discussion thereof, is included for technical reference purposes only and is not to be regarded subject matter by which the scope of the invention as defined in the claims is to be bound.

SUMMARY

A handheld pet spray wand according to the present disclosure may be configured advantageously for use in washing or bathing a pet, for example, a dog. The handheld pet spray wand may be configured for attachment to a hose that is further attached to a water supply source. The handheld pet spray wand may be operable to have a number of spray modes to assist in the cleaning of the pet. The handheld pet spray wand may further be configured to provide selective nozzle array sizes designed for both small and large pets. The form factor of the spray wand may further be ergonomically formed to provide a spray pattern conforming to the body of the pet.

In one exemplary implementation, a handheld sprayer includes a water supply connector and a handle housing the water supply connector. A mode control actuator may be attached to the handle. A may be valve fluidly connected with the water supply connector and adjusted by the mode control actuator. An elongate nozzle wand is in fluid communication with the valve. The nozzle wand may be formed in an arcuate shape and provide two linear nozzle arrays along a length of the elongate nozzle wand. The valve passes water flow through to a first of the linear nozzle arrays in either a constant low-flow mode or in a graduated, increasing flow mode. The valve passes water flow through to a second of the linear nozzle arrays, exclusive of the first linear nozzle array, in either a constant low-flow mode or in a graduated, increasing flow mode.

In another implementation, a handheld spray wand is disclosed. The spray wand including a fluid inlet and a nozzle portion in fluid communication with the fluid inlet, the nozzle portion including a first nozzle array extending along a longitudinal direction of the nozzle portion and a second nozzle array positioned adjacent to the first nozzle array and extending along the longitudinal direction of the nozzle portion, where the nozzles within the first nozzle array and the second nozzle array are staggered to define a staggered water pattern as water exits the nozzle pattern.

In yet another implementation, a handheld showerhead is disclosed that includes a handle portion configured to be fluidly connected to a water source and a nozzle portion coupled to the handle portion. The nozzle portion including a first plurality of nozzles arranged in a line along a line of the nozzle portion and a second plurality of nozzles arranged in a long along a length of the nozzle portion and positioned adjacent to and staggered relative to the first plurality of nozzles.

In another implementation a spray wand is disclosed. The spray wand including a water inlet, a handle portion fluidly coupled to the water inlet, and an elongated nozzle wand portion connected to the handle portion and fluidly coupled to the handle portion. The nozzle wand including a first linear row of nozzles extending in a first direction and a second linear row of nozzles extending in the first direction and offset relative to the first linear row of nozzles.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

FIG. 1B is a left side elevation view of the handheld pet spray wand of FIG. 1A.

FIG. 1C is a right side elevation view of the handheld pet spray wand of FIG. 1A.

FIG. 7A is a proximal end isometric view of an exemplary embodiment of a valve seat component of the handheld pet spray wand of FIG. 1A.

FIG. 7B is a distal end isometric view of the valve seat of FIG. 7A.

FIG. 8 is an isometric view of an exemplary embodiment of a valve seal component of the handheld pet spray wand of FIG. 1A.

FIG. 9 is an isometric view of an exemplary embodiment of a transition cover component of the handheld pet spray wand of FIG. 1A.

FIG. 10A is a proximal end isometric view of an exemplary embodiment of a bottom housing component of a nozzle wand of the handheld pet spray wand of FIG. 1A.

FIG. 11 is an isometric view of an exemplary embodiment of a connector shaft component of the handheld pet spray wand of FIG. 1A.

FIG. 14A is an isometric view of a first cross-section of the handheld pet spray wand of FIG. 1A.

FIG. 14B is an isometric view of a second cross-section of the handheld pet spray wand of FIG. 1A.

DETAILED DESCRIPTION

Figure 1A:
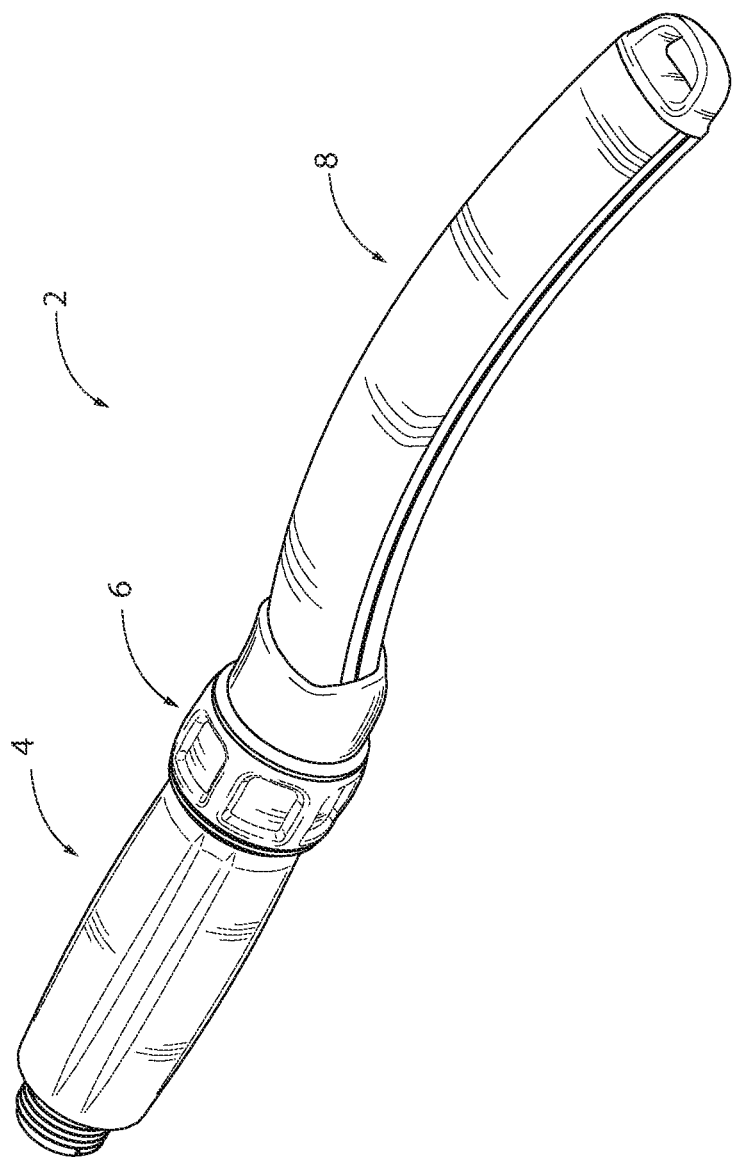
FIG. 1A is a top isometric view of a handheld pet spray wand according to an exemplary implementation.
Figure 1D:
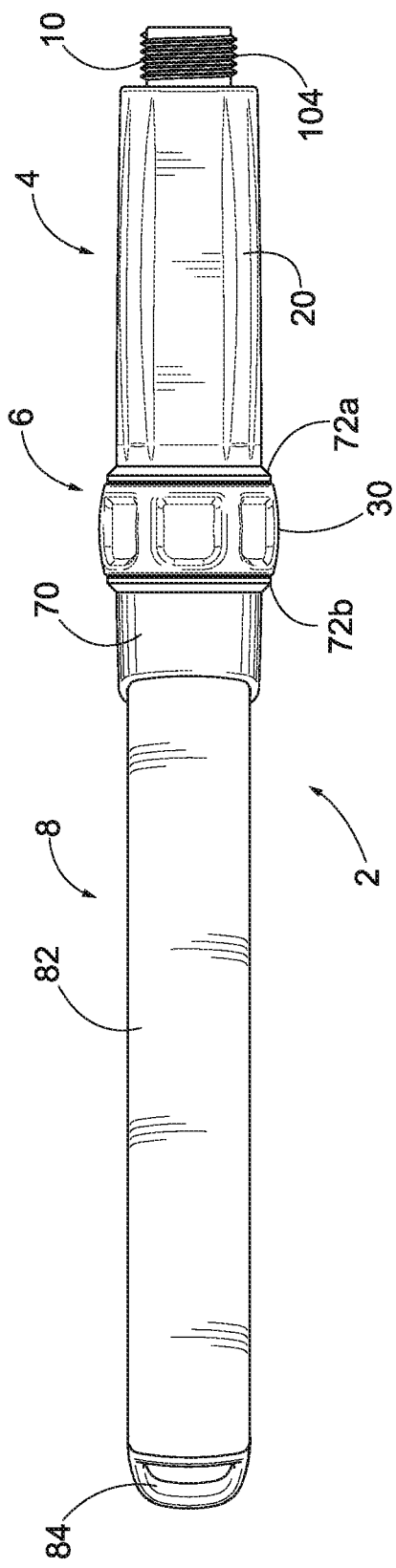
FIG. 1D is a top plan view of the handheld pet spray wand of FIG. 1A.

An exemplary implementation of a handheld pet spray wand 2 is shown in FIGS. 1A through 1E. The pet spray wand 2 may be primarily composed of a handle section 4, a mode selector section 6, and a nozzle wand section 8. The handle section 4 may be sized to be easily grasped by the user's hand and may further have surface features provided to allow a user to maintain a firm grip in a wet environment. Mode control section 6 may be positioned distal to the handle section 4 for ease of use by the user when holding the handle portion 4. The nozzle wand section 8 extends further distally from the mode selector section 6 in an elongated arcuate form. The form of the nozzle wand section 8 is designed to conform to the body of a pet during a washing or bathing process.

Components of Handheld Pet Spray Wand

Figure 1E:
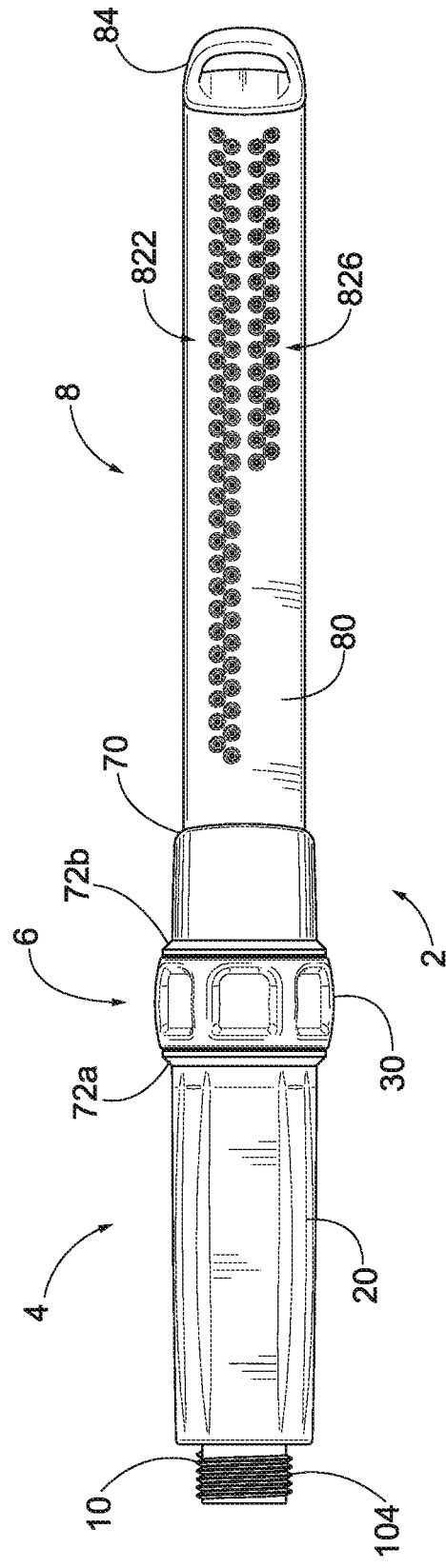
FIG. 1E is a bottom plan view of the handheld pet spray wand of FIG. 1A.
Figure 2:
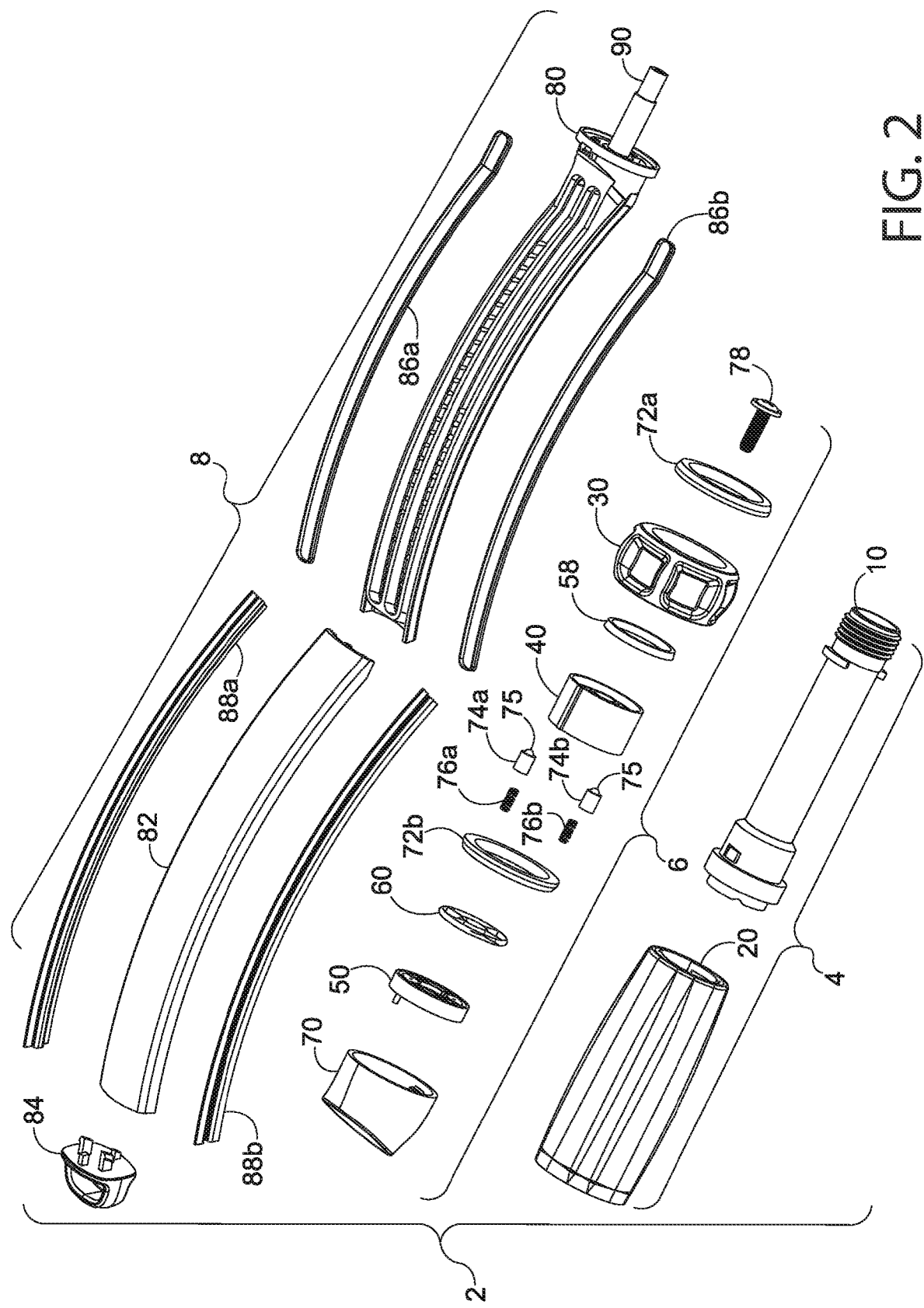
FIG. 2 is an exploded isometric view of the components of the handheld pet spray wand of FIG. 1A.

The major components of the handheld pet spray wand 2 are indicated in FIGS. 1B through 1E as well as in FIG. 2. The handle section 4 may be composed of an exemplary embodiment handle stem 10 surrounded by a handle grip 20. The mode selector section 6 may include a control ring 30 bounded on proximal and distal ends by trim rings 72a and 72b. A transition cover 70 may extend distally from the control ring 30 as the handheld pet spray wand 2 transitions from the mode selector section 6 to the nozzle wand section 8. Nozzle wand section 8 may be composed of a bottom housing 80, a top housing 82, and a hanger cap 84 positioned at a distal end of the top and bottom housings 80, 82. As shown in FIGS. 1B and 1C, sidewall trim pieces 88a, 88b may be interposed between the bottom housing 80 and the top housing 82.

Figure 3A:
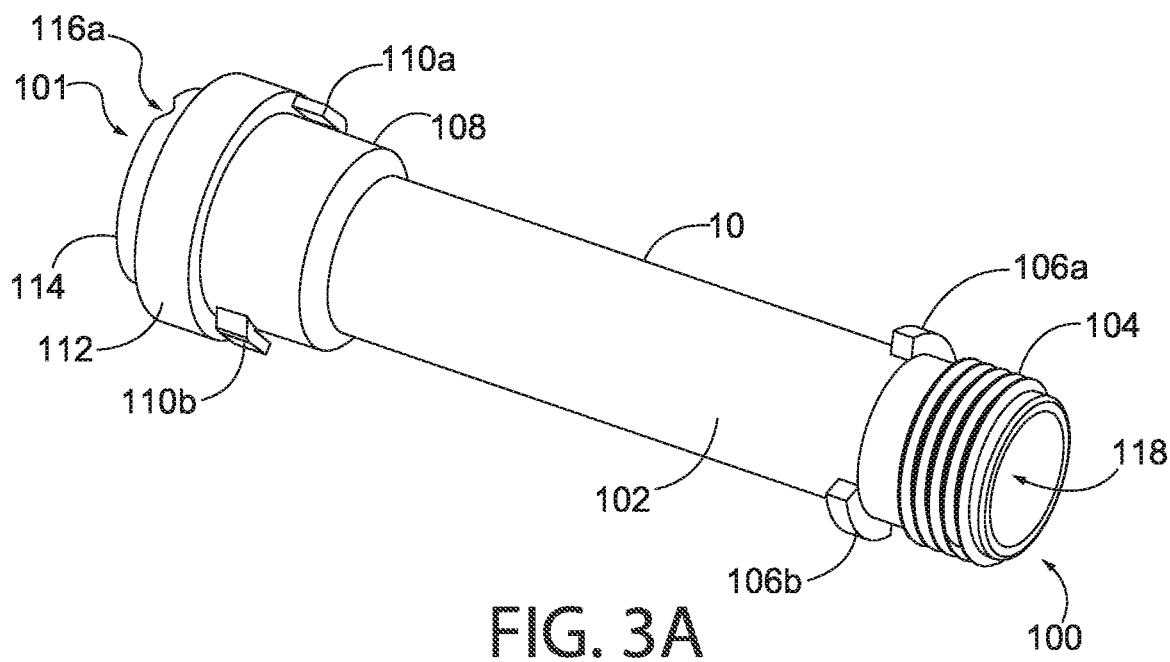
FIG. 3A is a side isometric view of an exemplary embodiment of a handle stem for the handheld pet spray wand of FIG. 1A.
Figure 3B:
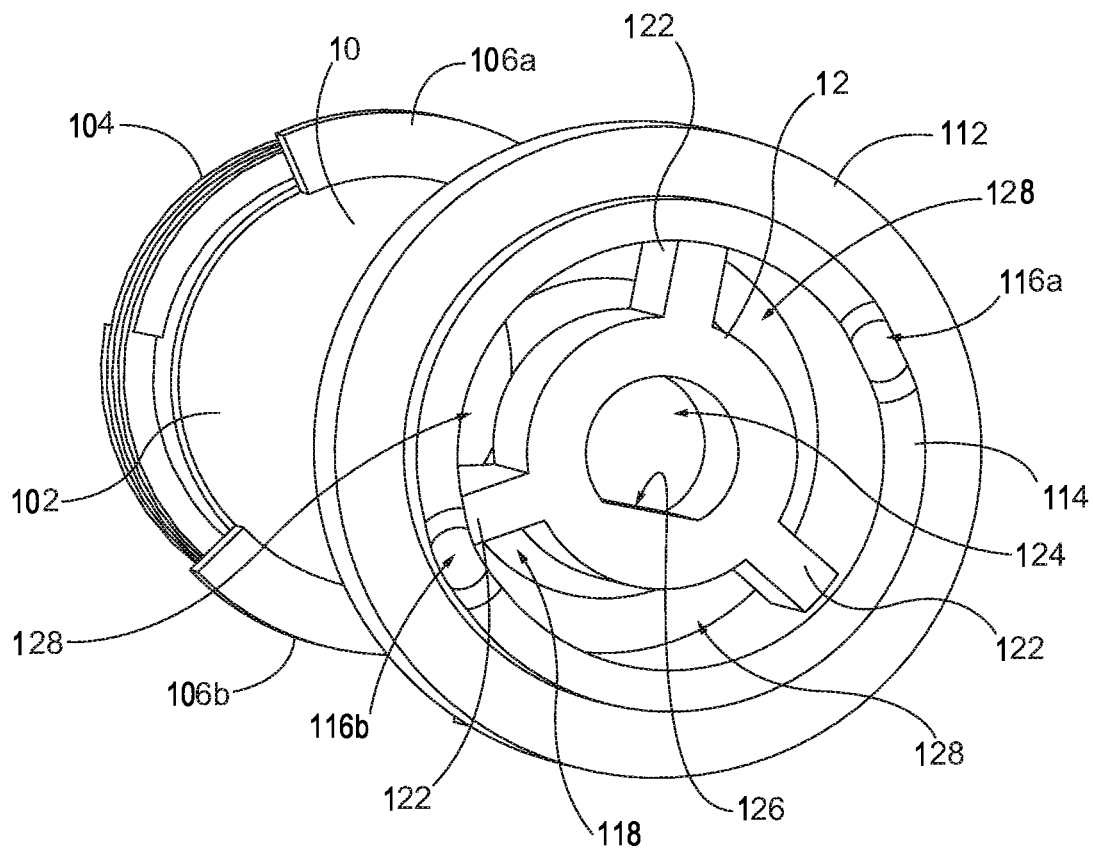
FIG. 3B is an enlarged distal end isometric view of the handle stem of FIG. 3A.

The handle stem 10 is shown in greater detail in FIGS. 3A and 3B. The handle stem 10 may primarily be defined by a stem shaft 102 formed as a hollow cylinder defining a shaft lumen 118. Threading 104 may be formed on the proximal end 100 of the stem shaft 102. The threading 104 may be used to connect the handheld pet spray wand 2 to a hose that is connected to the water supply source. Immediately distal to the threading 104 are a pair of opposing bayonet tabs 106a, 106b on opposing sides of the stem shaft. The bayonet tabs 106a, 106b may be formed as arcuate ridges extending for a discrete distance around opposing circumferential portions of the stem shaft 102. Toward the distal end 101 of the handle stem 10, the stem shaft 102 increases in diameter to form a shoulder 108. A slightly larger collar 112 is formed on the handle stem 10 distal to the shoulder 108. A pair of opposing lock tabs 110a, 110b may be formed on a surface of the shoulder 108 immediately proximal and adjacent to the collar 112. The lock tabs 110a, 110b may be formed as cantilevered strings having a base that attaches to the shoulder 108 and a ledge that extends outward from the base a short distance circumferentially around the shoulder 108 to define a gap between the cantilevered portion of the lock tabs 110a, 110b and the shoulder 108.

An annular lip 114 extends distally from the collar 112 at the distal end 101 of the handle stem. As shown in FIG. 3B, a pair plunger recesses 116a, 116b may be formed in an end surface of the annular lip 114. The plunger recesses 116a, 116b may be slight indentations in the annular lip. The plunger recesses 116a, 116b may be formed at opposing ends of a diameter extending across the annular lip 114.

Further as shown in FIG. 3B, a collet 120 may be arranged within the shaft lumen 118 of the handle stem 10. The collet 120 is a cylindrical ring supported within the center of the shaft lumen 118 by a number of struts 122 extending radially inward from an inner wall extending along the length of the shoulder 108 and the collar 112. A receiving aperture 124 may be defined within the center of the collet 120. The receiving aperture 124 is primarily cylindrical but may have a keyed surface 126. In this exemplary embodiment, the keyed surface 126 is shown as a flat wall in the otherwise cylindrical receiving aperture 124. However, other shapes or forms of a key could be defined within the inner wall of the collet 120 defining the receiving aperture 124. Further as shown in FIG. 3B, a number of arcuate passages 128 may be formed between and bounded by the inner walls of the shoulder 108 and collar 112, the struts 122, and an outer wall surface of the collet 120. The arcuate passages 128 are in fluid communication with the shaft lumen 118 extending through the length of the stem shaft 102.

Figure 4A:
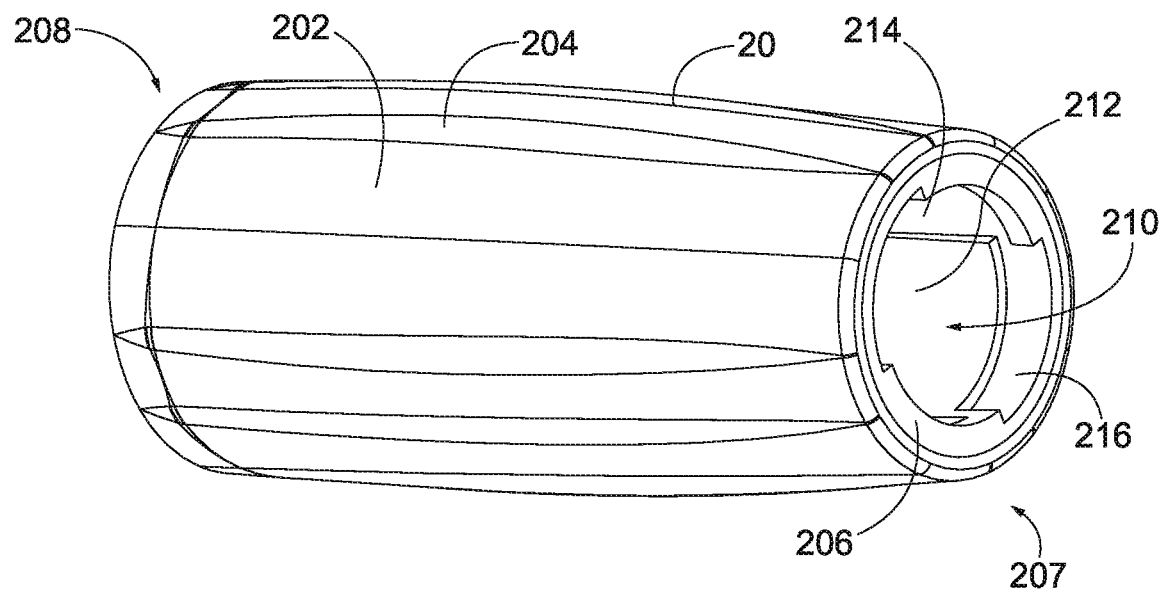
FIG. 4A is a proximal end, side isometric view of an exemplary embodiment of a handle grip of the handheld pet spray wand of FIG. 1A.
Figure 4B:
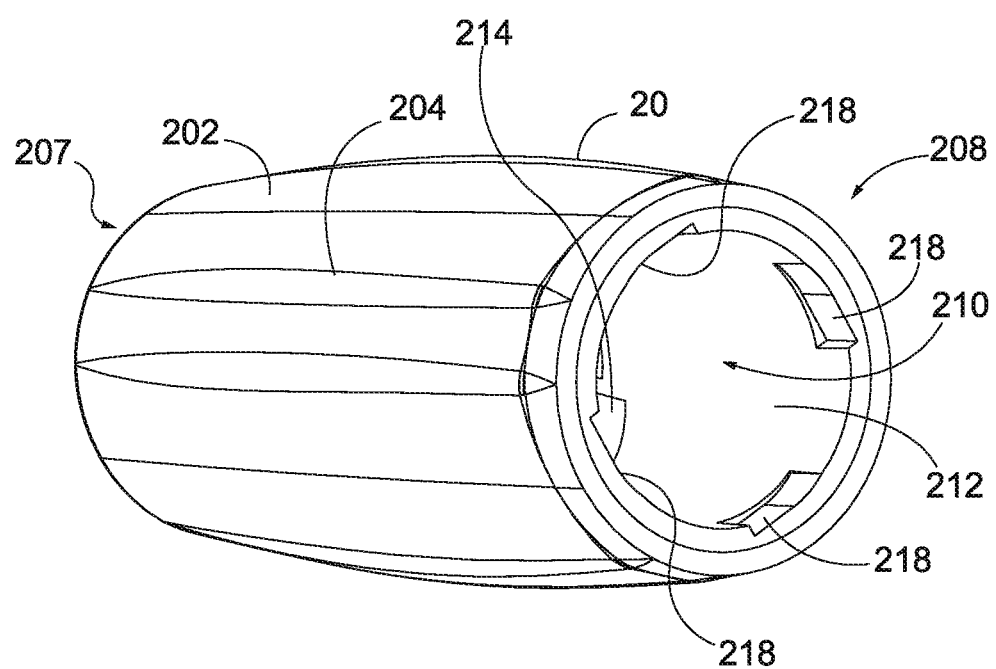
FIG. 4B is a distal end, side isometric view of the handle grip of FIG. 4A.

An exemplary embodiment of the handle grip 20 is shown in greater detail in FIGS. 4A and 4B. The handle grip 20 may be formed as a barrel 202 that is sized to cover a majority of the handle stem 10. An outer surface of the barrel 202 may be formed with longitudinal grip ridges 204 or other grip enhancing surface features, for example, fluting or knurling, in order to provide the user a slip resistant grip on the handheld pet spray wand 2 in a wet environment. Barrel 202 defines a handle lumen 210 through which the handle stem 10 is received. As shown in FIG. 4A, an inner surface 212 of the barrel 202 defines a bayonet slide recess 214 capped at the proximal end 207 by proximal wall 206. A second bayonet slide recess (not viewable) is similarly capped by a second proximal wall 206 directly circumferentially opposite from the other proximal wall 206. Two of the opposing bayonet lock recesses 216 are defined within the inner surface 212 between the two proximal end walls 206. The bayonet slide recesses 214 are each connected to a corresponding bayonet lock recess 216 by a gap between the inner surface 212 and a respective adjacent proximal wall 206.

The distal end 208 of the handle grip 20 is shown in FIG. 4B. A number of tab slots 220, in this exemplary embodiment 4, are formed within the inner surface 212 of the barrel 202 adjacent the distal end 208. The tab slots 218 may extend a distance circumferentially around the inner surface 212 and may be sloped from a shallow end on one side to a deeper as the tab slots 218 extend in a clockwise direction circumferentially when viewed from the distal end 208 as shown in FIG. 4B.

Figure 5:
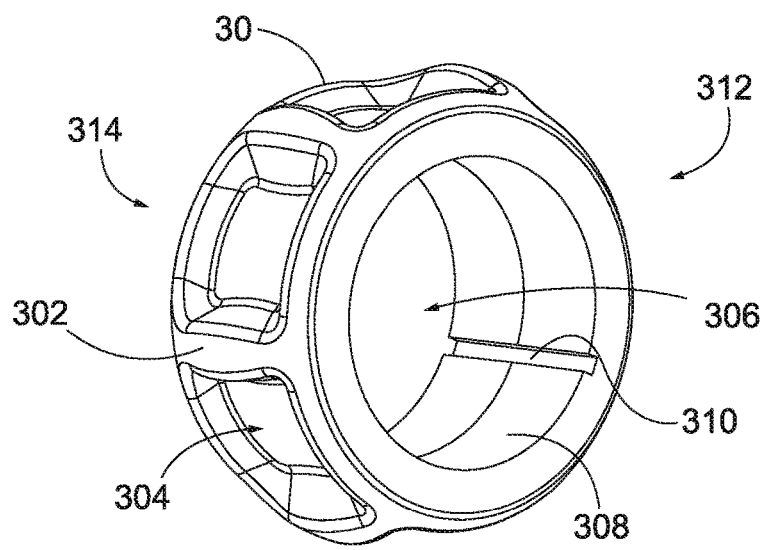
FIG. 5 is an isometric view of an exemplary embodiment of a control ring component of the handheld pet spray wand of FIG. 1A.

An exemplary embodiment of a control ring 30 in the mode selector section 6 is depicted in FIG. 5. An outer surface of the control ring 30 may be formed with knurls 302 defined between recessed pockets 304 circumferentially around the control ring 30. An aperture 306 may be formed axially through a center of the control ring 30 bounded by an annular inner wall 308. A rectangular slot 310 may be formed within the inner wall 308 extending from a proximal end 312 to a distal end 314 of the control ring 30 parallel to the axis of the aperture 306.

Figures 6A, 6B:
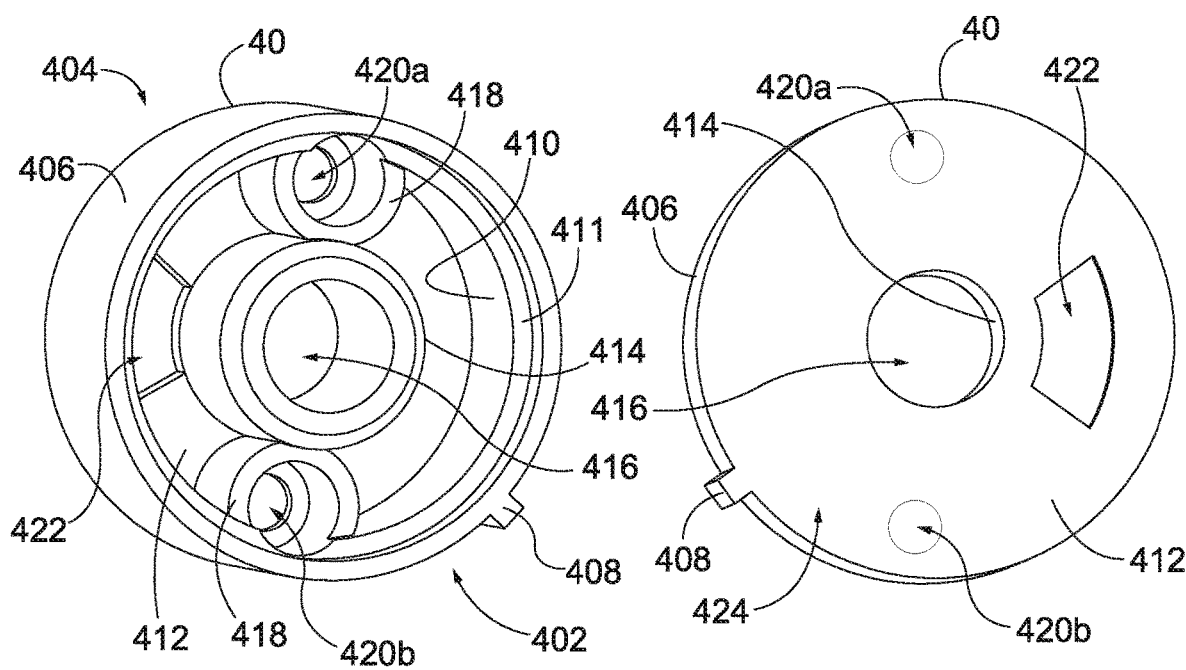
FIG. 6A is a proximal end isometric view of an exemplary embodiment of a valve body component of the handheld pet spray wand of FIG. 2.
FIG. 6B is a distal end isometric view of the valve body of FIG. 6A.

An exemplary embodiment of a valve body 40 is depicted in FIGS. 6A and 6B. The valve body 40 may be a cylindrically shaped component defined by a cylindrical outer wall 406 extending towards a proximal end 402 away from a base wall 412 at a distal end 404. A key ridge 408 may be formed on and extend radially outward from an outer surface of the outer wall 406. The key ridge 408 may be generally rectangular in shape and extends linearly from the proximal end 402 to the distal end 404 in parallel with a longitudinal axis of the valve body 40. A cylindrical boss 414 may extend proximally outward from the base wall 412 and may be bounded by, but separated from, the outer wall 406 of the valve body 40. A diameter of the cylindrical boss 414 may be less than a diameter of the outer wall 406, for example, approximately one third the diameter of the outer wall 406 in order to form a cavity between the cylindrical boss 414 and an inner wall 410 of the valve body 40. The inner wall 410 may not extend as far toward the proximal end 402 as the outer wall 406 such that a shelf 411 is formed by a top surface of the inner wall 410.

The cylindrical boss 414 further defines a through hole 416 that extends completely through the base wall 412 of the valve body 40. In addition, two diametrically opposed detent pockets 418a, 418b are formed by walls extending semicircularly between the inner wall 410 and the cylindrical boss 414. Corresponding detent apertures 420a, 420b are formed through the base wall 412 within each of the detent pockets 418a, 418b. A single arcuate hole 422 (i.e., in the shape of a bent or curved trapezoid) is formed within the base wall 412 between the inner wall 410 and the cylindrical boss 414 on one side of the valve body 40 between the opposing detent pockets 418a, 418b. As shown in FIG. 6B, an outer face 424 of the base wall 412 on the distal side 404 of the valve body 40 is flat and is only interrupted by the through hole 416, the detent apertures 420a, 420b, and the arcuate hole 422.

An exemplary embodiment of a valve seat 50 within the mode selector section 6 of the handheld pet spray wand 2 is shown in greater detail in FIGS. 7A and 7B. A proximal side 502 of the valve seat 50 is depicted in FIG. 7A. An outer circumference of the valve seat 50 is defined by an annular rim 506 that extends outward from a recessed face 512. A number of pad surfaces similarly extend proximally outward from the recessed face 512. Two large arcuate pads 508a, 508b extend proximally outward from the recessed face on opposing sides of a shaft hole 514 defined through the axial center of the valve seat 50. The large arcuate pads 508a, 508b are separated by a pair of small arcuate pads 510a, 510b that similarly are positioned on opposing sides of the shaft hole 514. Each of the large arcuate pads 508a, 508b and small arcuate pads 510a, 510b are separated laterally from each other by seal channels 516 that form part of the recessed face 512. Similarly, radially inner edges of each of the large and small arcuate pads 508a, 508b, 510a, 510b are spaced apart from the shaft hole 514 such that a ring shaped portion of the seal channel 516 is formed around the shaft hole 514. Further, each of the large and small arcuate pads 508a, 508b, 510a, 510b are spaced apart from the rim 506 such that an annular portion of the seal channel 516 is formed adjacent the rim 506.

Each of the large arcuate pads 508a defines a corresponding arcuate port 518a, 518b extending entirely through the body of the valve seat 50 from the proximal side 502 to a distal side 504. The arcuate ports 518a, 518b do not extend the entire arc length of their corresponding large arcuate pad 508a, 508b, but rather only extend along a portion of the arc length. Sloped channels 520a, 520b are formed within portions of the large arcuate pads 508a, 508b adjacent to each of the arcuate ports 518a, 518b. The sloped channels 520a, 520b start from a shallow end and extend toward a deeper end that empties into the arcuate ports 518a, 518b, respectively. Each of the small arcuate pads 510a, 510b defines a small trickle hole 522a, 522b, respectively, through the thickness of the valve seat 50 from the proximal side 502 to the distal side 504.

The distal side 504 of the valve seat 50 is depicted in FIG. 7B. As shown, each of the arcuate ports 518a, 518b and the trickle holes 522a, 522b extend through the valve seat 50 to the distal side 504. Adjacent pairs of the arcuate ports 518a, 518b and trickle holes 522a, 522b empty into respective cavities defined within and recessed from a distal face 525 of the valve seat 50. A large nozzle cavity 530 contains a first arcuate port 518a and a first trickle hole 522a and is bounded by a semicircular half of a perimeter wall 528, a semicircular half of a ring wall 524 surrounding the shaft hole 514, and two radial dividing walls 526 extending along a diameter of the valve seat 50. A small nozzle cavity 532 contains a second arcuate port 518b and a second trickle hole 522b and is bounded by a semicircular portion of the perimeter wall, a semicircular portion of a ring wall 524 surrounding the shaft hold 514, and the two dividing walls 526. The large nozzle cavity 530 is thus a semicircular arcuate space in one half of the valve seat 50 and the small nozzle cavity 532 is likewise a semicircular space opposite the large nozzle cavity 530.

In addition, interface feature such as an alignment post 534 extends distally outward from the distal side 504 of the valve seat 50. The alignment post 534 is cylindrical but may be formed in other shape. The alignment post 534 is positioned radially inward from the perimeter wall 528 and thus extends from within the large nozzle cavity 530.

An exemplary embodiment of a valve seal 60 is depicted in FIG. 8. The valve seal may be configured to fit within the seal channels 516 formed on the proximal side 502 of the valve seat 50. The valve seal 60 may be composed of an elastomeric or rubber material in order to form a watertight seal between the valve body 40 and the valve seat 50. The valve seal 60 may be formed with an inner ring 602, an outer ring 604, and a number of spokes 606 extending between the inner ring 602 and the outer ring 604.

An exemplary embodiment of a transition cover 70 for the handheld pet spray wand 2 covers a portion of the mode selector 6 as it transitions into the nozzle wand 8 as depicted in FIG. 9. The transition cover 70 may be formed as a hollow body having an outer surface 706 and an inner surface 708 defined between openings in the proximal end 702 and distal end 704. The body of the transition cover 70 may taper somewhat amorphously from the proximal end 702 to the distal end 704. The proximal end 702 may be formed in a circular shape in order to make adjacent to the control ring 30. The distal end 704 may be formed more in the shape of a rounded rectangle to transition into the cross sectional shape of the nozzle wand 8. A pair of clip tabs 710a, 710b may extend radially inward from opposing top and bottom positions on the inner surface 708 of the transition cover 70 adjacent the proximal end 702.

Figure 10B:
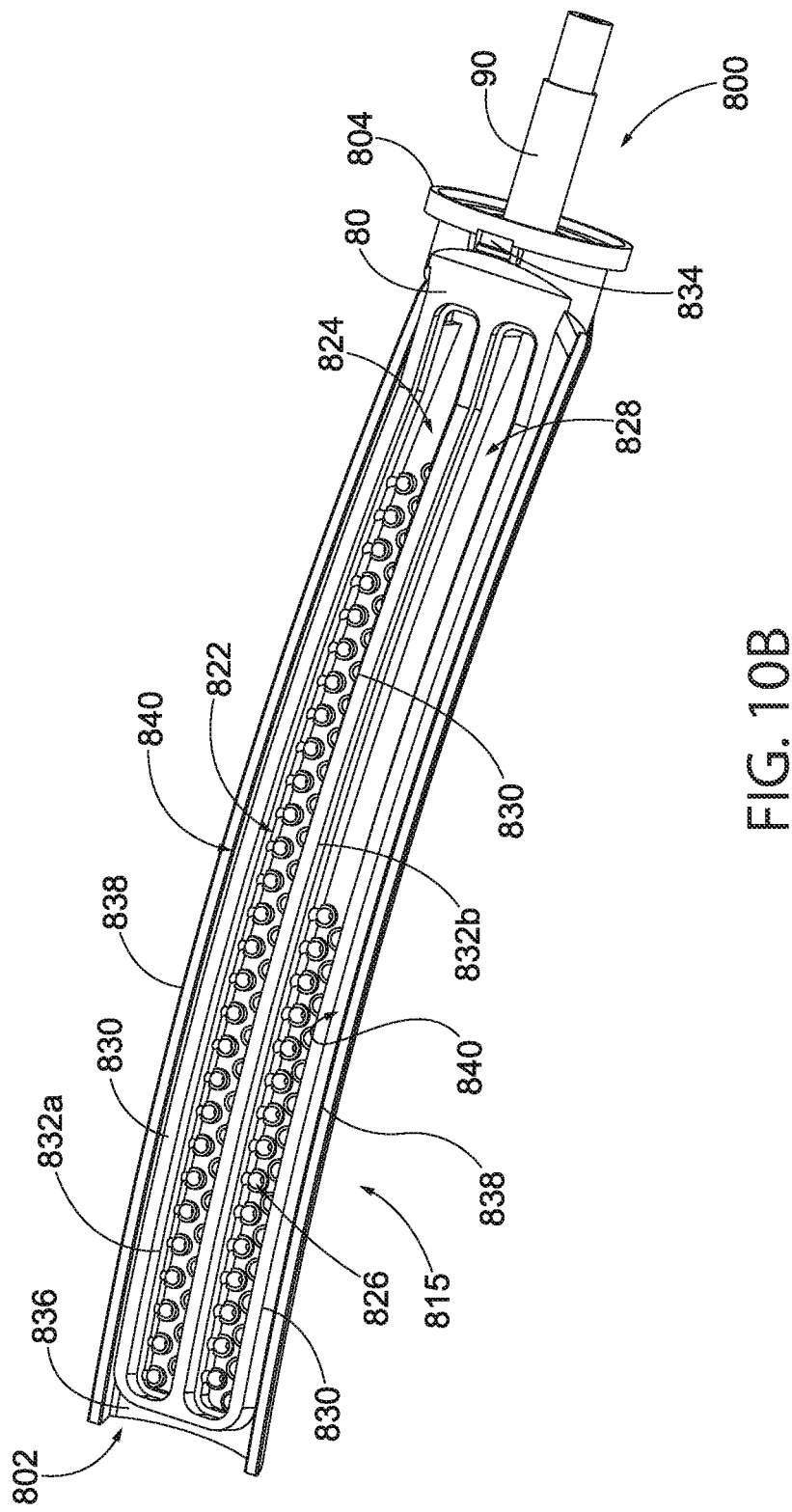
FIG. 10B is a top isometric view of the bottom housing component of FIG. 10A.

An exemplary embodiment of a bottom housing component 80 of the nozzle wand portion 8 of the handheld pet spray wand 2 as depicted in FIGS. 10A and 10B. FIG. 10A shows the bottom housing 80 from a proximal end 800 thereof. An outer circumference of the proximal end 800 of the bottom housing 80 is defined by an annular lip 804 that extends proximally outward from an annular seat rim 806 that is recessed from and extends radially inward from the annular lip 804. An interface feature such as a post boss 812 extends radially inward as a tab from an edge of the seat rim 806 and defines a post aperture 814 therethrough.

A shaft ring 808 is suspended within an aperture defined by the seat rim 806 by a pair of opposing shaft ring struts 810 that extend radially inward from the seat rim 806 to connect with the shaft ring 808. A connector shaft 90 extends proximally outward from the shaft ring 808. Two separate fluid chambers are formed on opposing sides of the shaft ring 808 and further separated by the shaft ring struts 810. A large nozzle chamber 816 is defined on a first side of the shaft ring 808 and is in fluid communication with a long nozzle channel 824 that is further defined within the bottom housing 80. A short nozzle chamber 818 is defined on the opposite side of the shaft ring 808 and is in fluid communication with the short nozzle channel 828 also defined within the bottom housing 80. Portions of the large nozzle chamber 816 and short nozzle chamber 818 may be defined by a recessed flow cavity 820 divided in half by one of the shaft ring struts 810.

The bottom housing 80 extends distally in the form of an elongated arcuate base wall 836. Two separate longitudinal, linear arrays of nozzles extend proximally from a distal end 802 along portions of the length of the base wall 836 toward a connector end 805 of the bottom housing 80. A long nozzle array 822 extends a majority of the length from the distal end 802 to the connection structure 805 of the bottom housing 80. A short nozzle array 826 may extend only a portion of the length of the base wall 836. In one exemplary embodiment as depicted, the short nozzle array 826 may be positioned adjacent to the distal end 802 of the bottom housing 80 and extend only half the length of the base wall 836 toward the proximal end 800. Each of the nozzle openings within the base wall may be formed or molded directly within the base wall 836. In other embodiments apertures may be formed in the base wall 836 and fitted with separate plastic or elastomeric nozzle fittings.

As shown in the figures, each of the long nozzle array 822 and the short nozzle array 826 may be formed as two longitudinal rows of adjacent nozzles staggered with respect to each other. Each of the long nozzle channel 824 and the short nozzle channel 828 may be formed by channel walls that extend from the connection structure 805 at the proximal end 800 of the bottom housing 80 to the distal end 802. The channel walls 830 extend upward from the base wall 836 and define two parallel channels along the length of the base wall 836. Nozzle apertures for the long nozzle array 822 are formed within the base wall 836 within the bounds of the long nozzle channel 824. Similarly, the openings for the short nozzle array 826 are formed within the bounds of the short nozzle channel 828. The long nozzle channel 824 is separated from the short nozzle channel 828 by a middle wall of the channel walls 830. The channel walls 830 may further define cover shelves 832a, 832b that extend around the perimeters of the long nozzle channel 824 and the short nozzle channel 828, respectively.

Catch clip pockets 834 may be defined at top and bottom positions of the connector structure 805 immediately distal to the annular lip 804. The base wall 836 of the bottom housing 80 may wrap upward to form sidewalls 838 along the length of the nozzle portion 815 such that gaps 840 are formed between each of the sidewalls 838 in the exterior channel walls 830.

An exemplary embodiment of a connector shaft component 90 for connection with the bottom housing 80 and other components of the handheld pet spray wand 2 is shown in greater detail in FIG. 11. The connector shaft 90 may be generally cylindrically shaped along its actual length. A center spindle section 906 is fully cylindrical in form and comprises a majority of the length of the connector shaft 90. An engagement shaft portion 908 extends from the distal end 904 of the spindle section 906. The engagement shaft 908 is cylindrical but has a smaller diameter than a diameter of the spindle section 906. A number of retention rings 910a, 910b may be formed circumferentially on the engagement shaft 908. As shown a first retention ring 910a is positioned at the distal end 904 of the engagement shaft while a second retention ring 910b is positioned at an intermediate location between the distal end 904 and the end of the spindle section 906. The retention rings 910a, 910b may be formed as annular ridges around the engagement shaft 908 and may further define a number of axially aligned notches along the circumference thereof.

A keyed shaft 912 may extend from the proximal end of the spindle section 906. The keyed shaft is primarily cylindrical having a diameter smaller than the diameter of the spindle section 906. A keyed surface 914 may interrupt the cylindrical shape of the outer surface of the keyed shaft 912. The keyed surface 914 may be formed to mate with the keyed surface 126 within the collet 120 of the handle stem 10. A threaded bore hole 916 may be formed and centered axially within the keyed shaft 912 and is open to the proximal end 902.

Figure 12:
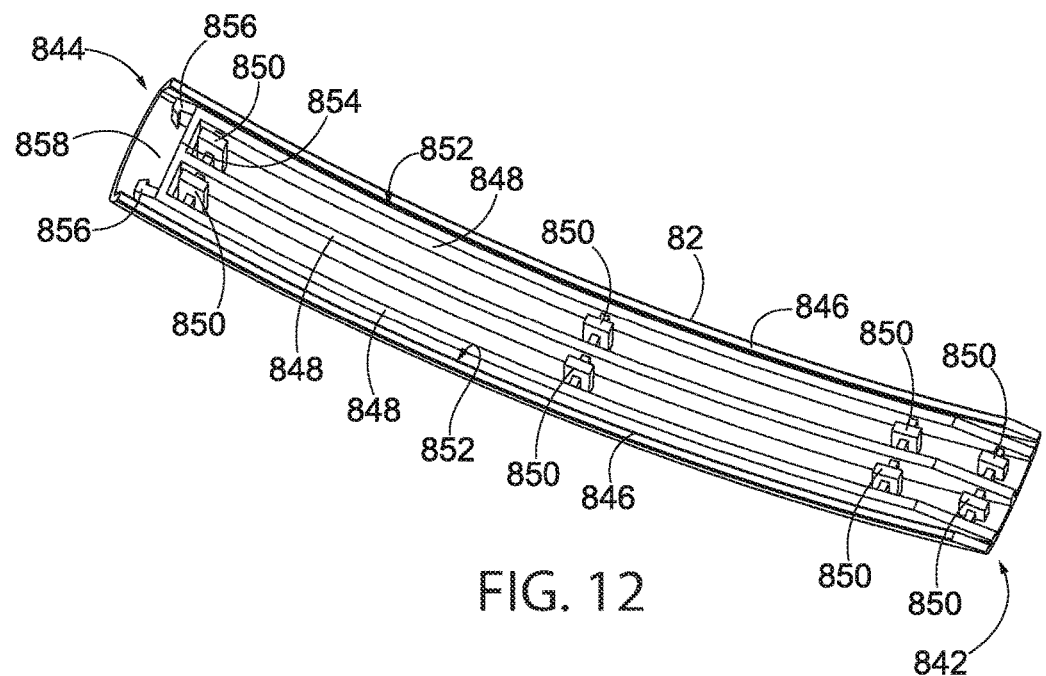
FIG. 12 is a bottom isometric view of an exemplary embodiment of a top housing component of a nozzle wand section of the handheld pet spray wand of FIG. 1A.

An exemplary embodiment of a top housing component 82 for attachment to the bottom housing component 80 of the handheld pet spray wand 2 as depicted in FIG. 12. The top housing 82 may have a smooth arcuate top surface 858 of a same width as the width of the bottom housing 80. Opposing sidewalls 846 may extend downward from the lateral edges of the top surface 858 and extend the length of the top housing 82. A number of support walls 848 may run the length of the top housing 82 from the proximal end 842 to a position adjacent to but spaced apart from the distal end 844 three longitudinal support walls 848 may run in parallel extending downward from the top surface 858 and may be spaced apart and sized to align with the channel walls 830 in the bottom housing 80. A number of buttresses 850 may be formed between the support walls 848 and may extend from the top surface 858 downward beyond the height of the support walls 848. The buttresses 850 may be further attached laterally to each adjacent support wall 848 by tabs for additional support.

Support walls 848 and any corresponding buttresses 850 located adjacent to proximal end 842 may be sloped downward toward the proximal end 842 in order to better conform to the structure of the bottom housing 80. Similar to the structure of the bottom housing 80, the sidewalls 846 of the top housing 82 may be spaced slightly apart from the outside support walls 848 in order to form gaps 852 there between running the length of the top housing. An end wall 854 may be formed to cap the ends of the support walls 848 at the distal end 844 of the top housing. A pair of latch fingers 856 may extend distally from the end wall spaced laterally apart along the width of the end wall. The catches of the latch fingers 856 may be directed inwardly toward each other.

Figures 13A, 13B:
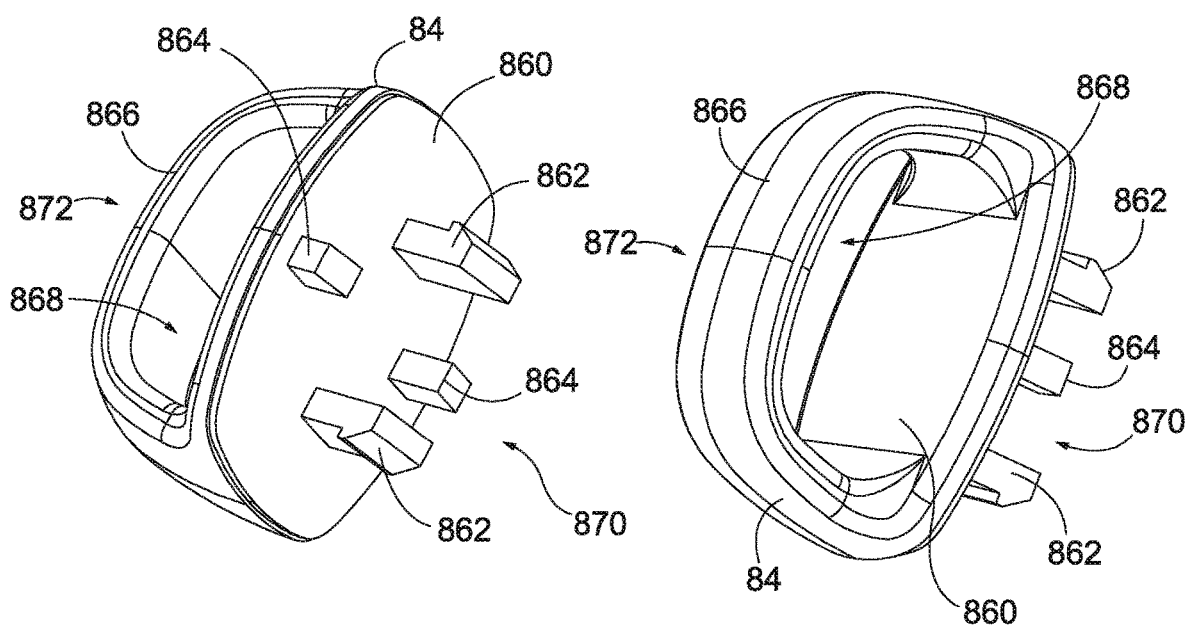
FIG. 13A is a proximal end isometric view of an exemplary embodiment of a hanger cap component of the handheld pet spray wand of FIG. 1A.
FIG. 13B is a distal end isometric view of the hanger cap of FIG. 13A.

An exemplary embodiment of a hanger cap component 84 of the nozzle wand portion 8 of the handheld pet spray wand 2 is depicted in greater detail in FIGS. 13A and 13B. The hanger cap 84 is defined primarily by an oblong base plate 860 and a U-shaped bridge 866 extending from a distal side 872 of the base plate 860. A bridge aperture 868 is defined between the bridge 866 and the base plate 860 legs of the bridge 866 may be spaced apart laterally as wide as a width of the base plate 860. A pair of latch fingers 862 may extend proximally outward from a proximal side 870 of the base plate 860. Catches of the latch fingers 862 may be oriented outward toward the lateral edges of the base plate 860. In addition a number of alignment blocks 864 may extend outward from the proximal side 870 of the base plate 860.

Assembly of Handheld Pet Spray Wand

The following discussion details an exemplary method for assembling the components of the handheld pet spray wand 2 of FIG. 1A. The method described is exemplary only and other methods or orders of operation may be used to assemble the handheld pet spray wand 2.

In one embodiment the proximal end 100 of the handle stem 10 may be inserted into the handle lumen 210 at the distal end 208 of the handle grip 20. The handle stem 10 may be oriented such that the bayonet tabs 106a, 106b are aligned with the bayonet slide recesses 214 within the inner surface 212 of the handle grip 20. When the bayonet tabs 106a, 106b reach and abut against the proximal wall 206 of the handle grip 20, the handle stem 10 may be rotated counterclockwise when viewed from the distal end 208 and the handle grip 20 such that the bayonet tabs 106a, 106b seat within the bayonet lock recesses 216 in the inner surface 212 of the handle grip 20. Simultaneously during such counterclockwise rotation, the lock tabs 110a, 110b may slide into the tab slots 218 in the inner surface of the handle grip 20 at the distal end 208 of the handle grip 20. In this way the handle stem 10 will be locked within the barrel 202 of the handle grip 20 with the threading 104 of the handle stem 10 extending out of the handle lumen 210 beyond the proximal end 207 of the handle grip 20.

The connector shaft 90 may next be attached to the shaft ring 808 in the bottom housing 80. The engagement shaft 908 of the connector shaft 90 may be inserted into the shaft ring 808 of the bottom housing 80 such that the spindle section 906 abuts against the shaft ring 808 of the bottom housing 80. The engagement shaft 908 may be adhered or otherwise fixed within an aperture defined within the shaft ring 808. In the exemplary embodiment shown of the connector shaft 90 may be a machined or cast brass piece, or other anti-corrosive metal, and the bottom housing 80 may be insert molded around the engagement shaft 908 such that the retention rings 910a, 910b anchor the connector shaft 90 within the molded plastic of the bottom housing 80.

The mode selector portion 6 may next be assembled. Initially, the valve seat 50 may be aligned with the proximal end 800 of the bottom housing 80 such that the alignment post 534 on the distal side 504 of the valve seat 50 seats within the post aperture 814 of the post boss 812. The distal face 525 of the valve seat 50 should seat flush against the seat rim 806 of the bottom housing 80. Similarly the dividing wall 526 and the ring wall 524 will seat against the shaft ring 808 and the shaft ring struts 810 of the bottom housing 80. In this manner the large nozzle cavity 530 on the valve seat 50 will align with the large nozzle chamber 816 on the bottom housing 80 and the small nozzle cavity 532 on the valve seat 50 will similarly align with the short nozzle chamber 818 on the bottom housing 80. The distal side 504 of the valve seat 50 may be fixed to the bottom housing 80 for example by sonic welding, adhesive, or other known method of attachment. In this configuration the shaft connector 90 will extend through the shaft hole 514 in the valve seat 50 in proximal direction.

The valve seal 60 may next be seated on the recessed face 512 on the proximal side 502 of the valve seat 50. The outer ring 604, the inner ring 602, and the spoke 606 seat within the seal channels 516 of the valve seat 50 and thus surround each of the arcuate pads. The valve seal 60 may be made of a rubber or other elastomeric material in order to prevent leakage of water flow through the mode selector portion 6. The valve seal 60 may be of a thickness such that it extends proximally beyond the height of the rim 506 and the arcuate pads on the proximal side 502 of the valve seat 50. At this point the distal trim ring 72b may be placed over the outer circumference of the valve seat 50.

The detent springs 76a, 76b may be inserted into the cavities in the detent plungers 74a, 74b. The detent plungers 74a, 74b may then be inserted into respective detent pockets 418 within the valve body 40 such that the plunger tips 75 extend through the dented apertures 420. Next the valve body 40 may be inserted within the aperture 306 of the control ring 30 such that the key ridge 408 on the outer wall 406 of the valve body 40 is aligned with and slides within the slot 310 of the inner wall 308 of the control ring 30. Then the proximal trim ring 72a may be seated circumferentially around the collar 112 of the handle stem 10 protruding distally out of the distal end 208 of the handle grip 20. Next the annular U-cup seal 58 may be placed around the outer surface of the annular lip 114 to abut against an end face of the collar 112 of the handle stem 10. Further the control ring 30 with the valve body 40 seated therein may be placed against the handle stem 10 such that the proximal end 312 of the control ring 30 seats on top of a portion of the outer surface of the collar 112 while the outer wall 406 of the valve body 40 slips around the annular lip 114 of the handle stem such that a proximal face of the outer wall 406 abuts against the U-cup seal 58 to create a water tight seal between the handle stem 10 and the valve body 40.

Assembly of the mode selector portion 6 may then be completed by inserting the connector shaft 90 through the through hole 416 in the cylindrical boss 414 of the valve body 40 such that the spindle section 906 seats within the cylindrical boss 414. Further, the keyed shaft 912 may be inserted into the collet 120 of the handle stem 10 such that the keyed surface 126 of the collet 120 aligns with the keyed surface 914 of the keyed shaft 912 of the connector shaft 90. A screw 78 may be inserted into the shaft lumen 118 from the proximal end 100 of the handle stem 10 when screwed into the threaded blind hole 916 in a proximal end 902 of the keyed shaft 912. The keyed shaft 912 may be sized such that its length is coextensive with a thickness of the collet 120. Further the length and size of the head of the screw 78 may be selected such that when the screw is completely fastened within the threaded blind hole 916, the head of the screw abuts against a proximal end of the collet 120 to thereby hold the handle portion 4 and the mode selector portion 6 of the handheld pet spray wand 2 to the bottom housing 80 of the nozzle wand portion 8. The length of the connector shaft 90 and the various components of the mode selector portion 6 may be chosen such that the screw 78 compresses the components together enough to ensure water tight seals are achieved by the U-cup seal 58 and the valve seal 60 while still allowing freedom of rotation of the valve body 40 against the valve seat 50.

The remainder of the nozzle wand portion 8 may be constructed. Initially the channel covers 86a, 86b may be placed within each of the long nozzle channel 824 and the short nozzle channel 828, respectively, the channel covers 86a, 86b may be fixed within the nozzle channels 824, 828 in order to create a water tight seal. This may be accomplished by using a water tight adhesive or by sonically welding the channel covers 86a, 86b to the cover shelves 832a, 832b, or by other known methods. Once the channel covers are in place, the sidewall trim 88a, 88b may be placed along the sidewalls 838 of the bottom housing 80 such that a bottom edge of each of the sidewall trim pieces 88a, 88b seats within the gaps 840 between each of the sidewalls 838 and the channel walls 830. Next the top housing 82 may be placed on top of the bottom housing 80 such that top edges of the sidewall trim pieces 88a, 88b fit within the gaps 852 between the sidewalls 846 and the support walls 848 of the top housing 82. Further is the top housing 82 is placed upon the bottom housing 80, the buttresses 850 may be placed against the channel covers 86a, 86b in order to further hold the channel covers 86a, 86b in place. The top housing 82, the sidewall trim pieces 88a, 88b, and the bottom housing 80 may then all be fixed together for example with adhesive or by ultrasonically welding the components together.

The transition cover 70 may be placed over the assembled housing 80, 82 at a distal end thereof and slid along a length of the housing 80, 82 until the proximal end 702 of the transition cover abuts against the distal trim ring 72b surrounding the valve seat 50. The clip tabs 710a, 710b may seat within corresponding clip latches 834 in a connection structure 805 adjacent to the annular lip 804 of the bottom housing 80 in order to secure the transition cover 70 to the bottom housing. The distal end 704 of the transition cover extends over the proximal end 842 of the top housing 82 and along the base wall 836 of the bottom housing in order to provide a smooth transition from the mode selector portion 6 to the nozzle wand portion 8.

Finally the hanger cap is attached to the distal end of the top and bottom housing 82, 80. The latch fingers 862 on the base plate 860 of the hanger cap may engage the corresponding latch fingers 856 on the end wall 854 of the top housing. The alignment blocks 864 extending from the base plate 860 of the hanger cap may seat against the top surface 858 of the top housing 82 and the base wall 836 of the bottom housing 80 in order to prevent the hanger cap 84 from sliding up and down on the end of the housing 80, 82.

Operation of the Handheld Pet Spray Wand

An exemplary embodiment of the handheld pet spray wand 2 may be operated in a number of modes based upon user selection through the mode selector portion 6. Operation of the mode selector 6 can actuate water flow through different groupings of nozzles as well as change the volume of water flow through the nozzle wand portion 8. As a preliminary step, the user must attach the handle portion 4 for the handheld pet spray wand 2 to a water source. Typically a hose connected to a water source will be screwed onto the threading 104 of the handle stem 10. Water can then flow through the shaft lumen 118 of the handle stem and around the collet 120 at the distal end 101 of the handle stem through the arcuate passages 128. At this point water will encounter the proximal end 402 of the valve body 40 and may reach the arcuate hole 422 in the base wall 412 of the valve body 40 regardless of the rotational orientation of the valve body 40. As noted, the distal side 404 of the base wall 412 of the valve body 40 seats against the valve seal 60 mounted within the seal channels 516 on the proximal side 502 of the valve seat 50.

As the user turns the control ring 30 either clockwise or counterclockwise, the inner face between the key ridge 408 on the valve body 40 and the slot 310 in the control ring 30 rotates the base wall 412 on the distal side 404 of the valve body against the proximal side 502 of the valve seat 50 to variously align the arcuate hole 422 with respect to various apertures in the valve seat 50. For example, if the valve body 40 is rotated such that the arcuate hole 422 is aligned with the small arcuate pad 510a, then water will flow through the arcuate hole 422 through the trickle hole 522a into the large nozzle cavity 530 on the distal side 404 of the valve seat 50 and ultimately through the long nozzle chamber 816 in the bottom housing 80 and into the long nozzle channel. Alternatively if the valve body is rotated 180 degrees from the prior position the arcuate hole 422 would be seated over the opposite small arcuate pad 510b and water would flow through the trickle hole 522b into the small nozzle cavity 532 on the distal side 504 of the valve seat and then through the short nozzle chamber 818 in the bottom housing 80 to ultimately reach the short nozzle channel 828. The fluid flow through the trickle holes 522a, 522b is a very low volume, low pressure flow. Flow through the first trickle hole 522a will ultimately exit through the nozzles of the large nozzle array 822 on the nozzle wand 8. Similarly water flowing through the second trickle hole 522b will eventually flow through the nozzles of the short nozzle array 826 on the nozzle wand 8. Since the control ring 30, the valve body 40, and the valve seat 50 can together control the flowrate of the water, the assembly of at least one of the control ring 30, the valve body 40, or the valve seat 50 may be referred to as a controller. For example, the control ring 30 may be referred to as a controller. In another example, the control ring 30 and the valve body 40 may be referred to as a controller.

It may be noted that in the exemplary embodiment of the handheld pet spray wand 2 depicted in the figures, the plunger tips 75 of the detent plungers 74a, 74b will seat in the plunger recesses 116a, 116b in the annular lip 114 of the handle stem 10 when the arcuate hole 422 of the valve body is directly aligned with the small arcuate pads 510a, 510b. In other embodiments the plunger recesses 116a, 116b may be located at other positions about the circumference of the annular lip in order to indicate different flow modes other than the trickle modes. In another alternative embodiment, more than two plunger recesses may be provided on the annular lip 114 in order to indicate exact positions of other flow modes to the user via the tactile feedback of the detent plunger 74a, 74b entering and leaving plunger recesses. In further alternative embodiments, only one detent plunger may be used to indicate various flow modes of the handheld pet spray wand 2.

As the user rotates the control ring 30 to move the arcuate hole 422 in the valve body 40 over either of the large arcuate pads 508a, 508b, different spray modes with different volumes and pressures may be effected. For example, when the control ring 30 is rotated in a clockwise direction as considered from the proximal end of the handheld pet spray wand, the arcuate hole 422 may begin to move over the sloped channels 520a, 520b on the large arcuate pads 508a, 508b. If tolerances are close, the base wall 412 of the valve body 40 will press against both the small arcuate pads 510a, 510b and the large arcuate pads 508a, 508b as it moves from one to the other providing no opportunity for water flow other than into the sloped channels 520a, 520b as the arcuate hole 422 begins to move across the large arcuate pads 508a, 508b.

As noted, the sloped channels 520a, 520b start very shallow and become deeper as they extend clockwise and ultimately empty into the arcuate ports 518a, 518b. When the arcuate hole 422 covers only a small portion of a sloped channel 520a, 520b, a very low volume and low pressure flow will be able to enter the sloped channels 520a, 520b and ultimately enter the arcuate ports 518a, 518b to reach the nozzle wand portion 8. However as the arcuate hole 422 moves further clockwise, the greater depth of the sloped channels 520a, 520b will allow for a graduated or increased volume of water flow into the arcuate ports 518a, 518b. Further along the arcuate hole 422 against pass over the arcuate ports 518a, 518b an even greater volume of water may pass into the arcuate ports 518a, 518b. Finally, when the arcuate hole 422 seats directly over and is coextensive with a respective arcuate port 518a, 518b, a largest volume of fluid flow into the nozzle wand portion 8 will be achieved.

Therefore when the arcuate hole 422 of the valve body 40 arrases over the sloped channel 520a and arcuate port 518a of the large arcuate pad 508a fluid flow will enter the large nozzle cavity 530 on the distal side 504 of the valve seat 50 to then pass through the long nozzle chamber 816 in the bottom housing and ultimately flow into the long nozzle channel 824 in the nozzle portion 815. Alternatively, when the arcuate hole 422 of the valve body 40 is seated over the sloped channel 520b and arcuate port 518b of the large arcuate pad 508b on the valve seat 50, fluid flow enters the small nozzle cavity 532 on the distal side 508 of the valve seat to ultimately travel through the short nozzle chamber 818 and into the short nozzle channel 828 of the nozzle portion 815.

As best shown in FIG. 1E, the long nozzle array 822 on the nozzle portion 815 of the handheld pet spray wand 2 may be approximately twice as long as the short nozzle array 826 on the nozzle portion 815 both of the nozzle arrays 822, 826 may be arranged in a linear fashion to provide an arc spray pattern to better bathe or wash a pet. For example, the arcuate shape of the nozzle wand portion 8 may conveniently direct water over the back of a dog. If the user has a large dog, the user may choose to direct flow through the long nozzle channel 824 and thus limit spray to flow through the long nozzle array 822. Alternatively if the user has a small pet, the user may use the control ring 30 to select fluid flow through the short nozzle chamber 818 and thus direct fluid spray through the short nozzle array 826. When not in use, the fluid supply may be turned off and the handheld pet spray wand may be conveniently hung by placing the bridge 866 of the hanger cap 84 over a hook, nail, or other convenient support structure.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples, and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A handheld spray wand comprising:
 a fluid inlet;
 a nozzle portion in fluid communication with the fluid inlet, the nozzle portion comprising:
  a first nozzle array extending along a longitudinal direction of the nozzle portion;
  a second nozzle array positioned adjacent to the first nozzle array and extending along the longitudinal direction of the nozzle portion;
 a handle grip positioned between the fluid inlet and the nozzle portion;
 a controller positioned between the handle grip and the nozzle portion, wherein the controller is movable relative to the nozzle portion to control fluid flow from the fluid inlet to the nozzle portion, in a first position of the controller the first nozzle array is fluidly coupled to the fluid inlet and the second nozzle array is fluidly decoupled from the fluid inlet and in a second position of the controller the first nozzle array is fluidly decoupled from the fluid inlet and the second nozzle array is fluidly coupled to the fluid inlet.

2. The handheld spray wand 1, wherein nozzles within the first nozzle array are staggered to define a staggered water pattern as water exits from the first nozzle array and nozzles within the second nozzle array are staggered to define a staggered water pattern as water exists the second nozzle array.

3. The handheld spray wand of claim 1, wherein the controller includes an outer surface defining recessed pockets positioned circumferentially around the controller.

4. The handheld spray wand of claim 1, wherein the controller includes a flow control valve.

5. The handheld spray wand of claim 2, wherein the first nozzle array extends across a longer length of the nozzle portion than the second nozzle array.

6. The handheld spray wand of claim 1, further comprising a handle stem extending from the nozzle portion and through the handle grip.

7. The handheld spray wand of claim 1, further comprising a bridge extending from a distal end of the nozzle portion to define an aperture for hanging the spray wand.

8. The handheld spray wand of claim 1, wherein the first nozzle array is positioned on a first side of a longitudinal axis of the nozzle portion and the second nozzle array is positioned on a second side of the longitudinal axis of the nozzle portion.

9. The handheld spray wand of claim 1, wherein the controller comprises a first mode aperture in fluid communication with the first nozzle array, wherein the first mode aperture has a varied width configured to vary a flow rate of water flow into the first nozzle array from the fluid inlet.

10. A handheld showerhead comprising:
a handle portion configured to be fluidly connected to a water source, the handle portion including a handle stem and a handle grip positioned on the handle stem;
a nozzle portion coupled to the handle portion, the nozzle portion comprising:
a first plurality of nozzles arranged in a line along a length of the nozzle portion; and
a second plurality of nozzles arranged in a line along a length of the nozzle portion and positioned adjacent to the first plurality of nozzles; and
a movable controller positioned between the handle grip and the nozzle portion and configured to vary water flow from the water source to the nozzle portion, wherein the movable controller comprises at least one mode aperture through which water flows to reach the nozzle portion, the at least one mode aperture having a varied width such that a position of the at least one mode aperture relative to the handle portion varies a flow rate of water to the nozzle portion.

11. The handheld showerhead of claim 10, wherein the first plurality of nozzles and the second plurality of nozzles are parallel.

12. The handheld showerhead of claim 10, wherein the nozzle portion extends at an angle relative to the handle portion.

13. The handheld showerhead of claim 10, wherein the first plurality of nozzles and the second plurality of nozzles together define a first nozzle array.

14. The handheld showerhead of claim 13, further comprising a second nozzle array including a first row of nozzles and a second row of nozzles.

15. The handheld showerhead of claim 14, wherein the first row of nozzles and the second row of nozzles have the same number of nozzles and are staggered relative to one another.

16. The handheld showerhead of claim 10, wherein the handle stem includes threading on a proximal end of the handle stem and a pair of tabs formed on opposing sides of the handle stem distally adjacent to the threading, wherein the pair of tabs extend around opposing circumferential portions of the handle stem, and wherein the handle grip defines recesses on an inner surface of the handle stem to receive the tabs of the handle stem.

17. The handheld showerhead of claim 10, wherein the handle stem includes an annular lip extending from a distal end of the handle stem, and wherein recesses are formed in the annular lip.

18. A spray wand comprising:
a water inlet;
a handle portion fluidly coupled to the water inlet, the handle portion including a handle stem and a handle grip positioned on the handle stem;
an elongated nozzle wand portion connected to the handle portion and fluidly coupled to the handle portion, the elongated nozzle wand portion comprising:
a first linear row of nozzles extending in a first direction; and
a second linear row of nozzles extending in the first direction and laterally offset relative to the first linear row of nozzles;
a controller positioned between the handle grip and the elongated nozzle wand portion, wherein the controller is movable relative to the handle grip and the elongated nozzle wand portion to adjust water flow from the water inlet to the elongated nozzle wand portion, in a first position of the controller the first linear row of nozzles is fluidly connected to the water inlet and the second linear row of nozzles is fluidly disconnected from the water inlet and in a second position of the controller the second linear row of nozzles is fluidly connected to the water inlet and the first linear row of nozzles is fluidly disconnected from the water inlet.

19. The spray wand of claim 18, wherein the first direction is a longitudinal direction of the elongated nozzle wand portion.

20. The spray wand of claim 19, wherein the first linear row of nozzles and the second row of nozzles are adjacent to one another.

21. The spray wand of claim 18, wherein the elongated nozzle wand portion extends in a non-parallel direction relative to the handle portion.

22. The spray wand of claim 18, further comprising:
a first nozzle array comprising the first linear row of nozzles and a third linear row of nozzles; and
a second nozzle array parallel to the first nozzle array comprising the second linear row of nozzles and a fourth linear row of nozzles, wherein the first nozzle array extends across a longer portion of the nozzle wand portion than the second nozzle array and comprises more nozzles than the second nozzle array.

\* \* \* \* \*